United States Patent
Aso et al.

(10) Patent No.: US 7,833,669 B2
(45) Date of Patent: Nov. 16, 2010

(54) FUEL CELL SYSTEM AND CONTROL METHOD

(75) Inventors: Takeshi Aso, Zushi (JP); Mitsunori Kumada, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1036 days.

(21) Appl. No.: 10/520,623

(22) PCT Filed: Mar. 11, 2004

(86) PCT No.: PCT/JP2004/003250

§ 371 (c)(1), (2), (4) Date: Jan. 10, 2005

(87) PCT Pub. No.: WO2004/082040

PCT Pub. Date: Sep. 23, 2004

(65) Prior Publication Data

US 2006/0040149 A1    Feb. 23, 2006

(30) Foreign Application Priority Data

Mar. 14, 2003 (JP) ............................. 2003-070667

(51) Int. Cl.
*H01M 8/00* (2006.01)
*H01M 10/44* (2006.01)
*H01M 10/50* (2006.01)

(52) U.S. Cl. ................. 429/428; 429/444; 429/429; 429/430; 429/62; 429/92

(58) Field of Classification Search ................... None
See application file for complete search history.

(56) References Cited

U.S. PATENT DOCUMENTS

| 4,670,702 | A | | 6/1987 | Yamada et al. |
| 5,964,309 | A | * | 10/1999 | Kimura et al. ............. 180/65.8 |
| 6,158,537 | A | | 12/2000 | Nonobe |
| 6,186,254 | B1 | * | 2/2001 | Mufford et al. ............. 180/65.3 |

FOREIGN PATENT DOCUMENTS

| JP | 01-187776 A | 7/1989 |
| JP | 9-231991 A | 9/1997 |
| JP | 11-176454 A | 7/1999 |
| JP | 2000-040536 A | 2/2000 |
| JP | 2002-050378 A | 2/2002 |
| JP | 2002-246053 A | 8/2002 |
| JP | 2003-031267 A | 1/2003 |
| JP | 2004-152681 A | 5/2004 |

* cited by examiner

*Primary Examiner*—Dah-Wei D Yuan
*Assistant Examiner*—Edu E Enin-Okut
(74) *Attorney, Agent, or Firm*—Foley & Lardner LLP

(57) ABSTRACT

An energy supply (ES) is formed by a fuel cell (1), a power distributor (4) connected to the fuel cell (1), and a secondary cell (7) connected to the power distributor (4), a whole load set (WL) is connected to the power distributor (4), and a controller (8) controls the power distributor (4) to warm the energy supply (ES) by alternatively repeating a power charging distribution (S61) in which power (Gm) generated at the fuel cell (1) is distributed to the secondary cell (7) and the load set (WL), and a power discharging distribution (S71) in which a sum of power (Gr) generated at the fuels cell (1) and power (Dp) discharged from the secondary cell (7) is distributed to the load set (WL).

15 Claims, 12 Drawing Sheets

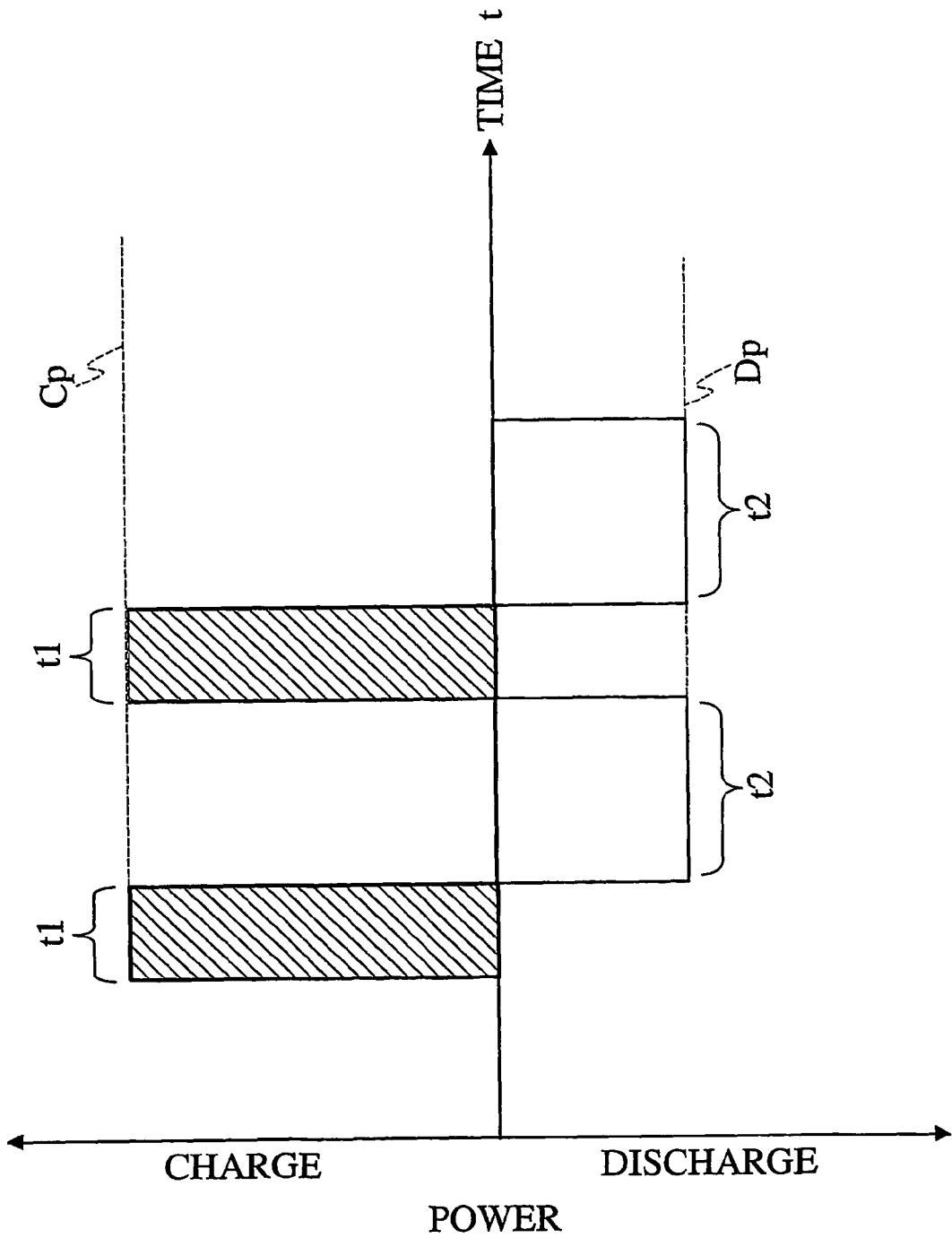

FUEL CELL SYSTEM AND CONTROL METHOD

TECHNICAL FIELD

The present invention relates to a fuel cell system and a control method, and particularly, to a fuel cell system to be mounted in a vehicle, for power supply to a set of electrical loads including a vehicular drive motor and a fuel cell stack's peripherals, and a control method of the same.

BACKGROUND ART

Japanese Patent Application Laying-Open Publication No. 9-231991 has disclosed techniques for a vehicle-mounted fuel cell system to supply necessary power to a set of electrical loads including a vehicular drive motor and a fuel cell stack's peripherals even in a startup of the fuel cell system under a low temperature condition.

The fuel cell system includes a battery for power supply to the drive motor in a startup of the system, allowing for a low output of the stack to supply power simply to the peripherals and minor loads drivable by low currents.

DISCLOSURE OF INVNETION

Under low temperature condition, both the battery and the stack have reduced output characteristics, so that the system tends to take a long time for warm-up.

The present invention is made, with this point in view. It therefore is an object of the invention to provide a fuel cell system and a control method of the same, allowing an efficient and short warm-up under low temperature condition.

According to an aspect of the invention, a fuel cell system comprises an energy supply comprising a fuel cell, a power distributor connected to the fuel cell, and a secondary cell connected to the power distributor, a load set connected to the power distributor, and a controller configured to control the power distributor to warm the energy supply by alternatively repeating a first power distribution having first power generated at the fuel cell and distributed to the secondary cell and the load set, and a second power distribution having a combination of second power generated at the fuel cell and third power discharged from the secondary cell, distributed to the load set According to another aspect of the invention, there is provided a control method of a fuel cell system comprising an energy supply comprising a fuel cell, a power distributor connected to the fuel cell, and a secondary cell connected to the power distributor, and a load set connected to the power distributor, the control method comprising controlling the power distributor to warm the energy supply by alternatively repeating a first power distribution having first power generated at the fuel cell and distributed to the secondary cell and the load set, and a second power distribution having a combination of second power generated at the fuel cell and third power discharged from the secondary cell, distributed to the load set

BRIEF DESCRIPTION OF THE DRAWINGS

The above and further objects and features of the invention, as well as functions and effects thereof, will be fully apparent from the following best mode for carrying out the invention, when the same is read in conjunction with the accompanying drawings, in which:

FIGS. 5A to 5C are time charts of working conditions of an energy supply in the pulsating warm-up cycle, in which FIG. 5A shows power generation at a stack of the energy supply, FIG. 5B shows power charge/discharge at a battery of the energy supply, and FIG. 5C shows a temperature variation of the battery;

FIGS. 6A and 6B are illustrations of relationships among generation, possible charge/discharge, and power consumption, in which FIG. 6A shows a relationship associated with maximum generation, and FIG. 6B shows a relationship associated with reduced generation; and FIGS. 7 to 11 are diagrams describing characteristics of the energy supply and associated terms.

BEST MODE FOR CARRYING OUT THE INVENTION

Figure 1:
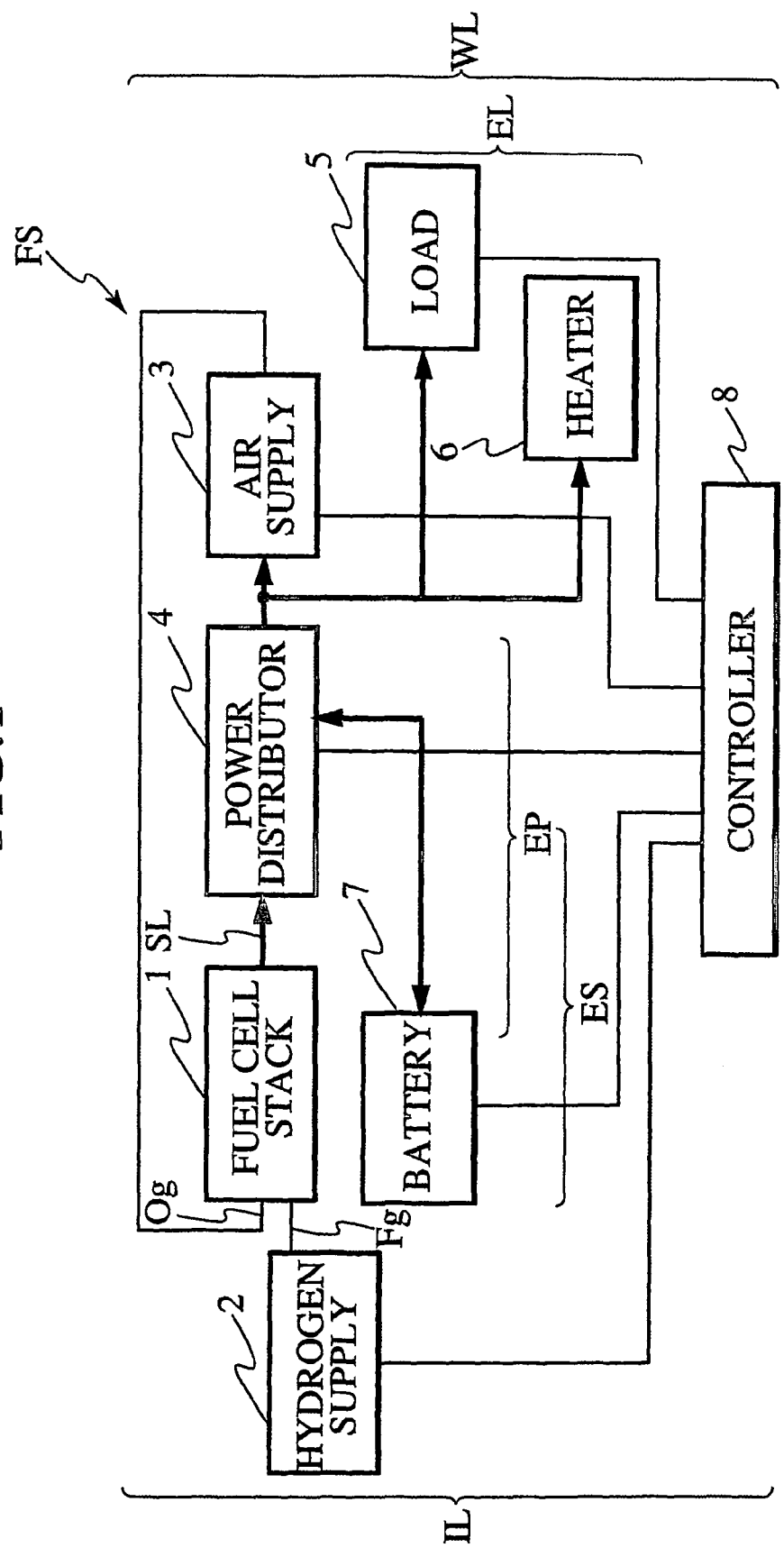
FIG. 1 is a schematic block diagram of a fuel cell system according to an embodiment of the invention.

There will be detailed below a best mode for carrying out the invention with reference to the accompanying drawings. Like elements are designated by like reference characters.

(Fuel-Cell System)

Figure 2:
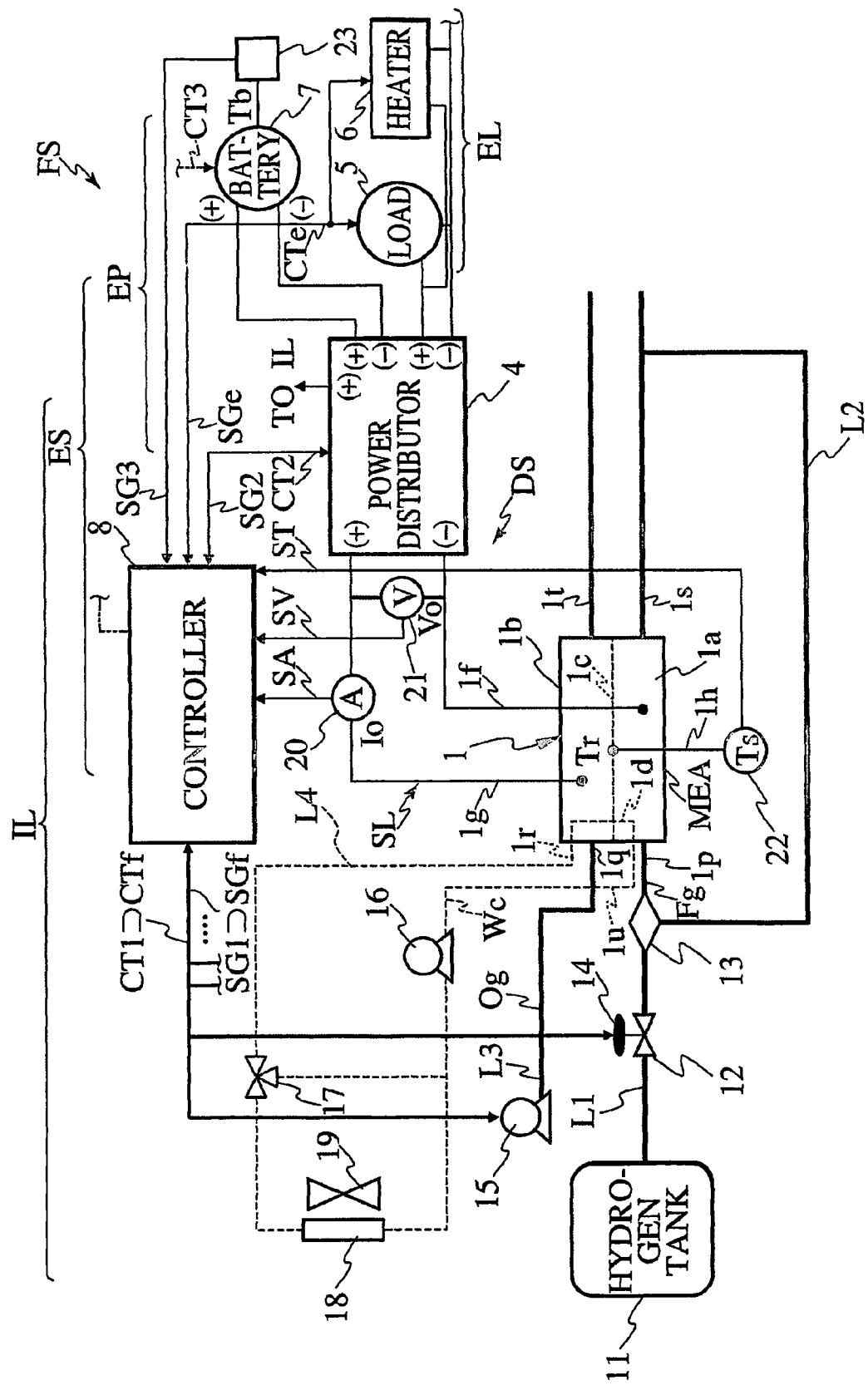
FIG. 2 is a detailed block diagram of the fuel cell system of FIG. 1.

Description is now made of a fuel cell system FS according to an embodiment of the invention, as the best mode, with reference to FIG. 1 and FIG. 2. FIG. 1 is a block diagram of the fuel cell system FS, and FIG. 2, a detailed diagram of the same with essential circuits.

The fuel cell system FS has a fuel cell stack 1 (FIGS. 1, 2) as an electric power supply configured to generate and supply electric power with a gaseous fuel Fg (FIGS. 1, 2) supplied from a hydrogen supply 2 (FIG. 1) and a gaseous oxidizer Og (FIGS. 1, 2) supplied from an air supply 3 (FIG. 1). The fuel cell system FS is mounted in a vehicle as an automobile (not shown), and the fuel cell stack 1 is normally adapted to supply sufficient power, via a power supply line SL (FIGS. 1, 2) thereof, to a whole set of associated electrical loads WL (FIG. 1) in the vehicle, covering a set of internal loads (hereafter collectively called "internal load") IL (FIGS. 1, 2) of the system FS, and a set of external loads (hereafter collectively called "external load") EL (FIGS. 1, 2) with respect to the system FS.

The internal load IL serves to support operation of the stack 1, and it is sometimes called "auxiliary equipment" therefor, as used herein. It is noted that each element of auxiliary equipment for a fuel cell stack of a general fuel cell system is not always an internal electrical load (i.e., auxiliary equipment≧internal load) of the general system, but the internal load IL does constitute auxiliary equipment (i.e., auxiliary equipment=internal load) of the stack 1 in the vehicle-mounted system FS. In this embodiment, the auxiliary equipment is categorized into: a first type (i.e. internal load IL except for a later-described air compressor 15, FIG. 2) that works as a minor or relatively invariable load in a startup of the fuel cell system FS; and a second type (i.e. the air compressor 15) that works as a major or relatively variable load in the startup.

The external load EL includes an influential load (hereafter simply called "load") 5 (FIGS. 1, 2) that refers in this embodiment to, but may additionally cover else than, a drive motor (not shown) for driving the vehicle, and a set of heating elements (hereafter collectively called "heater") 6 (FIG. 1, 2) that may directly or indirectly heat or warm the stack 1 and/or a later-described battery 7 (FIG. 1, 2).

The stack 1 is a lamination of layered unit cells and cell separators as frame members. Each unit cell is formed as a membranous electrode assembly MEA (FIG. 2) between neighboring separators, and configured with a pair of opposing hydrogen and air electrodes 1$a$, 1$b$ (FIG. 2), and a solid high-polymer electrolyte film 1$c$ (FIG. 2) disposed between the electrodes 1$a$, 1$b$.

For power generation, the hydrogen electrode 1$a$ is supplied with hydrogen gas, as the fuel Fg, and the air electrode 1$b$ is supplied with moisturized air containing oxygen, as the oxidizer Og. Each electrode 1$b$, 1$a$ can be cooled when necessary by cold water, as a coolant Wc (FIG. 2) supplied to a network of coolant paths 1$d$ (FIG. 2) in each cell separator.

It is noted that, for external connection of stack 1, each electrode 1$a$ or 1$b$ (as well as any associated fluid path or detection signal conductor) is connected to, and referred to in terms of, a common (in case of parallel connection), terminal (in case of serial connection), or representative (in case of signal) connection as shown in FIG. 2: e.g. (terminal) anode connection 1$f$, (terminal) cathode connection 1$g$, (representative) temperature signal connection 1$h$, (common) fuel supply connection 1$p$, (common) air supply connection 1$q$, (common) coolant supply connection 1$r$, (common) unused fuel collecting connection 1$s$, (common) waste air collecting connection 1$t$, and (common) coolant collecting connection 1$u$.

The hydrogen supply 2 includes, as shown in FIG. 2, a hydrogen supply line L1 connected to a hydrogen tank 11, which line L1 has a hydrogen pressure control valve 12, and a set of ejectors 13 installed downstream the pressure control valve 12. The pressure control valve 12 has a valve actuator 14 as an opening regulator controlled by a corresponding command of a set of fluid control commands (hereafter collectively called "fluid control command" or simply "command") CTf from a later-described system controller 8 (FIGS. 1, 2). The ejector set 13 may also be controlled by fluid control command CTf.

High-pressure hydrogen gas stored in the tank 11 is fed as the fuel Fg to each hydrogen electrode 1$a$, along the supply line L1, through the control valve 12 where its pressure is controlled, and through the ejector set 13 where it is accompanied with unused hydrogen returned from the hydrogen collecting connection 1$s$ via a return line L2 (FIG. 2). The unused fuel collecting connection 1$s$ may have a purge valve controlled by fluid control command CTf to make a hydrogen purge of stack 1, as necessary.

The air supply 3 includes, as shown in FIG. 2, an air supply line L3 connected to the air compressor 15 which is adapted for compression of atmospheric air to deliver compressed air. This air is supplied as the oxidizer Og to each air electrode 1$b$, at a controlled flow rate under a controlled pressure, wherefor fluid control command CTf controls motor rpm (revolutions per minute) and torque of the compressor 15. The air collecting connection 1$t$ has an air pressure control valve (not shown), of which opening may also be controlled by fluid control command CTf.

As shown in FIG. 2, the stack 1 is provided with a coolant recirculation line L4 for recirculating the coolant Wc through the stack 1. The recirculation line L4 includes a coolant recirculation pump 16, a radiator 18 with a cooling fan 19, and a three-port valve 17 operable to bypass the radiator 18. Fluid control command CTf controls on-off switching and delivery flow and pressure of the pump 16, as well as port selection of the valve 17 and rpm of the fan 19, to thereby adjust the temperature of coolant Wc.

The above-noted four fluid lines L1 to L4 are all associated with stack 1, and may have their line valves, such as supply main, electromagnetic shutoff, and safety valves, and miscellaneous line controls, which may also be controlled by fluid control command CTf. The stack 1 has its own peripherals (with four fluid lines L1 to L4 inclusive), which are individually controllable by a set of stack peripheral control commands (hereafter collectively called "peripheral control command" or simply "command") CT1 (FIG. 2), such that command CT1 ⊃ command CTf.

The fuel cell system FS includes a combination of: battery 7 as a secondary cell for electric energy storage or as an accumulator for electric energy accumulation; and a power distributor 4 (FIGS. 1, 2) installed in the power supply line SL of stack 1 and wholly controlled by a distributor control command CT2 (FIG. 2) from the controller 8. It is noted that electric energy is equivalent to a time-integration of electric power. If the power supply from stack 1 is insufficient for distribution, the distributor 4 makes the battery 7 discharge, to take out stored energy.

The combination of distributor 4 and battery 7 is configured, under control of the controller 8, to serve, in a sense, as an energy pump EP (FIGS. 1, 2) for pumping energy (or energized electrons) in an accumulating manner that allows a delayed or timing-controlled supply of energy with a linear or non-linear variation in quantity.

For effective service, the battery 7 may have an I/O (input/output) circuit or a parallel-serial switching connection installed between a number of sets of parallel-connected battery cell units and a pair of positive-pole (+) and negative-pole (−) terminals thereof, and adapted to be controlled by a battery control command CT3 (FIG. 2) from the controller 8 to change charge/discharge current and/or voltage at (+) terminal and/or between (+) and (−) terminals, respectively.

The distributor 4 has a number of terminals with (+) or (−) polarity: e.g. pair of (+) and (−) terminals for connection to the battery 7, (−) terminal for a common (−) line, (+) terminal for a common (+) line for power distribution to the external load EL, and (+) terminal for a common (+) line for power distribution to the internal load IL.

The power distributor 4 controls traffic of energy flow, so as to distribute supplied energy from the stack 1, as necessary, to the internal load IL (stack's peripherals with fluid lines L1 to L4, controller 8, distributor 4 itself, battery's I/O circuit or switching connection, if necessary, etc.) and the external load EL (load 5, heater 6, etc.), while storing surplus energy in the battery 7. Power supply to an individual internal or external load IL or EL can be controlled by a corresponding one of three control commands CT1 to CT3 for internal load IL, or of a set of external load control commands (hereafter collectively called "external load control command" or simply "command") CTe (FIG. 2), respectively.

The fuel cell system FS has, as shown in FIG. 2, a detection system DS for detecting current conditions of respective associated components and fluids: e.g. working conditions of stack 1, covering an output current Io through cathode connection 1$g$, an output voltage Vo between anode and cathode connections 1$f$, 1$g$, and a stack temperature Ts as a representative temperature Tr at electrolyte film 1$c$; working conditions of the stacks peripherals with fluid lines L1 to L4 inclusive; working conditions of distributor 4; working conditions of battery 7, covering an SOC (state of charge), a battery temperature Tb as a representative temperature, and (if necessary) a charge/discharge current at (+) terminal and/or charge/discharge voltage between (+) and (−) terminals of battery 7; and working conditions of external load EL. The stack temperature Ts may be represented by temperature of coolant Wc or ambient air. The battery temperature Tb may also be represented by ambient air temperature.

The detection system DS has necessary detectors, as shown in FIG. 2: e.g. a current detector 20 for detecting the output current Io of stack 1 to provide a detection signal SA of current Io, a voltage detector 21 for detecting the output voltage Vo of stack 1 to provide a detection signal SV of voltage Vo, a temperature detector 22 for detecting the stack temperature Ts to provide a detection signal ST representative of temperature Ts; a set of detection elements (not shown) for detecting the working conditions of the stack's peripherals to provide a set of stack peripheral detection signals (hereafter collectively called "peripheral detection signal") SG1 representative of these conditions, including detection elements for detecting working conditions of four fluid lines L1 to L4 to provide a set of fluid line detection signals (hereafter collectively called "fluid line detection signal") SGf representative of these conditions, such that detection signal SG1 ⊃ SGf; a set of built-in detection elements (not shown) for detecting the working conditions of distributor 4 to provide a set of distributor detection signals (hereafter collectively called "distributor detection signal") SG2 representative of these conditions; a battery condition detector 23 for detecting the SOC, battery temperature Tb, and (if necessary) charge/discharge current and/or voltage at or between (+) and/or (−) terminal(s) of battery 7 to provide a battery detection signal SG3 representative of these conditions; and various detection elements (not shown) for detecting the working conditions of external load EL to provide an external load detection signal SGe representative of these conditions. The detection signal SA of current Io, detection signal SV of voltage Vo, and detection signal ST of temperature Ts are sometimes collectively referred herein to "stack detection signal".

It will be apparent that the 110 circuit or switching connection of the battery 7 may be removed from the battery 7 to the power distributor 4. In this case, the battery control command CT3 from controller 8 is contained in the distributor control command CT2, and the distributor detection signal SG2 takes, from the battery detection signal SG3, and contains information on the charge/discharge current and/or voltage at or between the (+) and/or (−) terminal(s) of the battery 7. To this point, the distributor control command CT2 and battery control command CT3 is sometimes collectively referred herein to "energy pump control command", and the distributor detection signal SG2 and battery detection signal SG3 are collectively referred herein to "energy pump detection signal".

The fuel cell system FS is wholly governed by the system controller 8 configured as a data processor with a microcomputer, memories, interfaces, etc. The controller 8, which has necessary control programs, tables, and data stored in its memory or memories, further stores therein respective interfaced data, involving those of the stack detection signal (SA, SV, ST), peripheral detection signal SG1 (with fluid line detection signal SGf inclusive), EP (energy pump) detection signal (SG2, SG3), and external load detection signal SGe, and executes read program(s) to process such data as necessary for calculation, decision, and/or command to provide the peripheral control command CT1 (with fluid line control command CTf inclusive), EP (energy pump) control command (CT2, CT3), and/or the external load control command CTe, thereby controlling power generation at the stack 1 and energy flow traffic as well as energy accumulation at the energy pump EP to be both suitable for required power supply to the whole load set WL (i.e. internal load IL as auxiliary equipment, and external load EL).

It will be seen that the energy pump EP (as combination of battery 7 and distributor 4) supplied with power from the stack 1 (i.e. EP+1=1+4+7) constitutes an electric energy supply ES (FIGS. 1, 2) as a power supply for supplying electric energy as power to the whole load set WL in an energy accumulating manner. In other words, in the fuel cell system FS: an energy supply (ES) is configured with a fuel cell (1), a power distributor (4) connected to the fuel cell (1), and a secondary cell (7) connected to the power distributor (4); and the power distributor (4) is controlled from the controller (8) for an efficient warm-up of the energy supply (ES), as well as for power distribution to a whole set of loads (WL). It is noted that the combination (1+4+7) of stack 1, distributor 4, and battery 7 works as a power supply, but is called herein as "energy supply" ES for identification from stack 1 which inherently serves as a power supply.

The system controller 8 is configured to serve as a (intra-ES or ES-external) governor or controller to execute a (battery detection signal monitoring) "first warm-up control" for controlling the combination of stack 1 and battery 7 to be fully warmed up in a startup of fuel cell system FS, and a (stack detection signal monitoring) "second warm-up control" for controlling the stack 1 to be sufficiently warmed up together with the battery 7, as necessary, along with the startup (or if desirable, in a continued operation) of fuel cell system FS. It is noted that stack detection signal also is monitored in the first warm-up control, and that battery detection signal also is monitored in the second warm-up control. In both warm-up controls, the controller 8 drives stack 1 to generate electricity, as necessary for the stack's own dissipation of heat to achieve an efficient warm-up of stack 1. The battery 7 also is controlled to repeat a cycle of charge and discharge, as necessary for the battery's own dissipation of heat to achieve an efficient warm-up of battery 7.

For controlling energy supply ES, the controller 8 provides stack peripheral control command CT1 and EP control command CT2+CT3, of which combination is sometimes called "ES (energy supply) control command" (CT1+CT2+CT3) that is equivalent to an IL (internal load) control command. The detection system DS detects the stack 1 together its peripherals, to provide stack detection signal (SA, SV, ST) together with peripheral detection signal SG1, and the energy pump EP, to provide EP detection signal SG2+SG3. All of these (SA, SV, ST, SG1, SG2, SG3) may be collectively called "ES (energy supply) detection signal", which is a combination of stack detection signal (SA+SV+ST) and IL (internal load) detection signal (SG1+SG2+SG3).

(First Warm-Up Control)

Figure 3A:
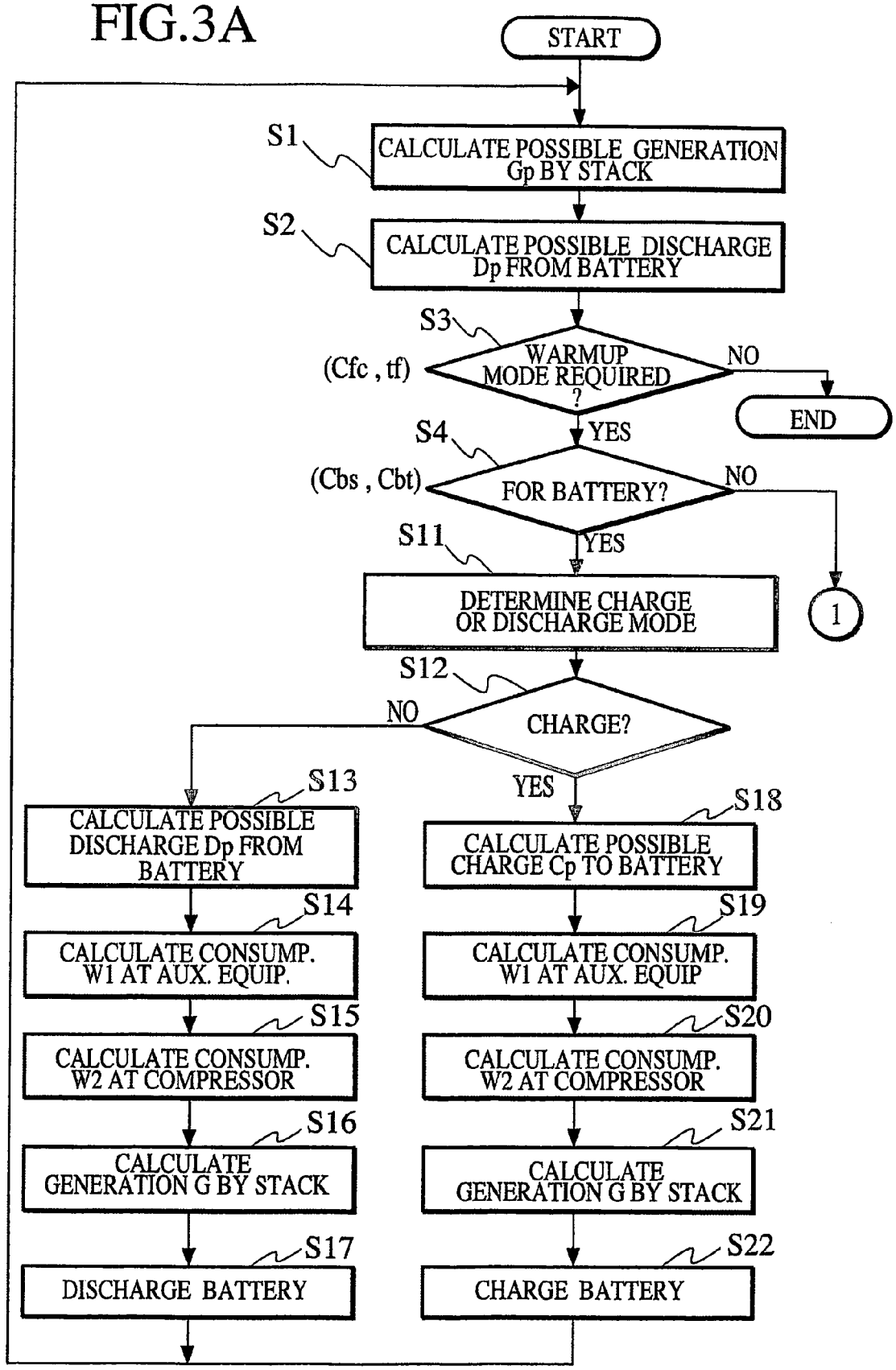
FIG. 3A is a flowchart of a full warm-up cycle in a first warm-up control of the fuel cell system of FIG. 1.
Figure 3B:
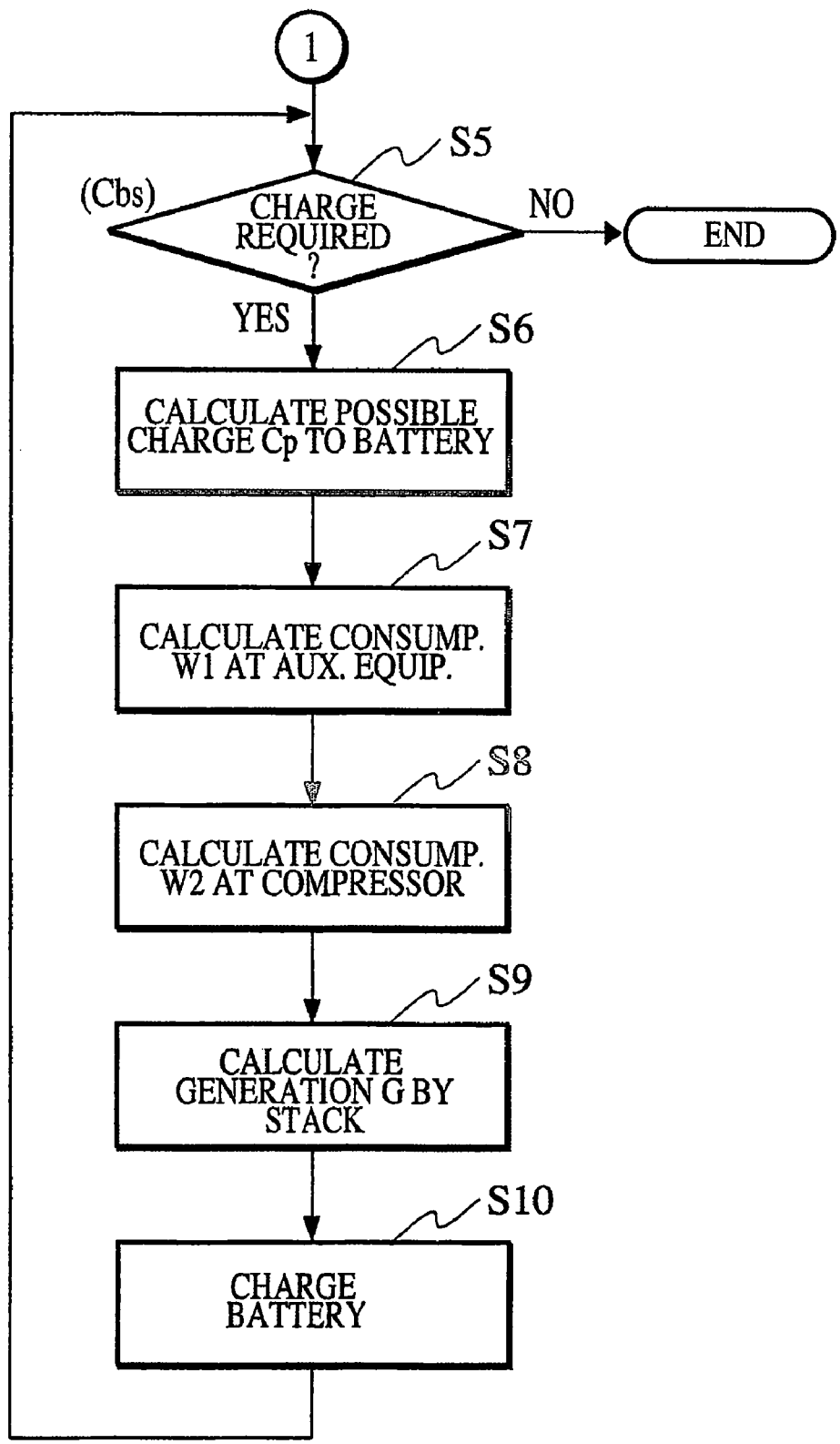
FIG. 3B is a flowchart of an SOC complement cycle in the first warm-up control.

Description is now made of the first warm-up control of fuel cell system FS, with reference to FIGS. 3A and 3B. The first warm-up control is programmed as a full warm-up cycle (steps S1 to S22) with an SOC complement cycle (steps S5 to S10) inclusive, to be repeated to drive the load 5. FIG. 3A shows the full warm-up cycle, excluding the SOC complement cycle. FIG. 3B shows the SOC complement cycle.

The controller 8 starts the full warm-up cycle (S1 to S22), upon receipt of an external command input thereto (e.g. from a vehicle controller detecting an inserted operation key) for starting generation of electricity at the stack 1, before entering a normal run of the fuel cell system FS at a later-described decision step S3 (FIG. 3A) or S5 (FIG. 3B). The system controller 8 may be part of the vehicle controller.

At a step S1, an estimation by calculation is made to determine a possible power generation (hereafter called "possible generation") Gp (FIG. 3A) by the stack 1, in terms of a constant or parametric function (e.g. of time t within a prescribed time interval tf to be long enough for the combination of stack 1 and battery 7 to be fully warmed up).

The stack 1 has an output characteristic varying in dependence on the stack temperature Ts, such that the output voltage Vo tends to decrease, as the temperature Ts decreases from a normal temperature range (>0° C.) to a low temperature range ($\leqq 0°$ C.) where electrolytic reaction for electricity generation has a reduced activity. The possible generation Gp is thus calculated from a detected stack temperature Ts (as detection signal ST), by collation to a stored experimental map or relationship between possible generation Gp and stack temperature Ts, or by use of an expression representing characteristics of current Io and voltage Vo relative to stack temperature Ts.

The stack temperature Ts may be a representative temperature Tr in stack 1, or temperature of coolant Wc. It may be an ambient or outdoor air temperature subject to the lapse of sufficient time after interrupt of generation.

At a step S2, an estimation by calculation is made to determine a possible power discharge (hereafter called "possible discharge") Dp (FIG. 3A) from the battery 7, in terms of a constant or parametric function (e.g. of time t within the time interval tf).

The battery 7 has a decreased possible discharge Dp in the low temperature range ($\leqq 0°$ C.) where secondary cell reaction may be insufficient in activity. The possible discharge Dp varies depending on the SOC as well. It (Dp) is increased in a high SOC range, and decreased in a low SOC range with a continued discharge. The possible discharge Dp is thus calculated from a combination of detected battery temperature Tb and detected SOC (in detection signal SG3), by collation to a stored experimental map or relationship between possible discharge Dp and combination of battery temperature Tb and SOC, or by use of an expression representing characteristics therebetween.

At the step S3, a sum of possible generation Gp and possible discharge Dp is compared with a full warm-up cycle criterion Cfc {as a threshold value=Cfc(constant) or as a threshold function Cfc (parameter: e.g. time t) within time interval tf}, for a decision as to whether a full warm-up mode (S4 to S22) is required. If the criterion Cfc is met, the control flow gets out of the full warm-up cycle, and goes to an end, entering the normal run. Or else {i.e. constant Gp+constant Dp<Cfc(constant), or Gp)parameter)+Dp(parameter)$\notin$(admissible range of function Cfc(parameter)}, the control flow goes to a decision step S4, entering the full warm-up mode (S4 to S22), where the combination of stack 1 and battery is fully warmed up so that the criterion Cfc be met In the normal run, the energy supply ES (i.e. stack 1+energy pump EP=1+4+7) has, and is adapted with Cfc met, to supply required power anytime for the whole load set WL (i.e. internal load IL+external load EL). The criterion Cfc is set in consideration of (a) potential variation(s) of required power during the time interval tf after start of power supply, where e.g. auxiliary equipment and/or load 5 may have (a) changed condition(s) requiring increased power. If the normal run be entered without Cfc met, the energy supply ES might have suffered a faulty condition failing to supply required power before the lapse of time interval tf.

At the step S4, a combination of interfaced SOC and temperature Tb from battery detection signal SG3 is compared with a pair of SOC complement cycle criteria Cbs and Cbt {as threshold values=Cbs(constant) and Cbt(constant) or as threshold functions Cbs (parameter: e.g. time t) and Cbt (parameter: e.g. time t), respectively, within time interval tf}, for a decision as to whether the SOC complement cycle (S5 to S10) is required. If the SOC is high enough {i.e. SOC$\geqq$Cbs (constant) or SOC $\epsilon$ admissible range of Cbs(parameter)} or the temperature Tb is insufficiently high {i.e. Tb<Cbt(constant) or Tb $\notin$ admissible range of Cbt(parameter)} for the battery 7 to discharge commensurate power as necessary for whole load set WL, the control flow goes to a subsequent step S11 to enter a battery warm-up mode (steps S11 to S22). Or else {i.e. SOC<Cbs(constant) or SOC $\notin$ admissible range of Cbs(parameter), and Tb$\geqq$Cbt(constant) or Tb $\epsilon$ admissible range of Cbt(parameter)}, the control flow enters the SOC complement cycle (FIG. 3B), where it goes to a decision step S5. The battery 7 is now allowed to be charged up to a sufficient SOC to discharge commensurate power as necessary for whole load set WL so that the criterion Cbs be met At the step S5, an interfaced SOC from battery detection signal SG3 is compared with the criterion Cbs for a decision as to whether a battery charge mode (steps S6 to S10) is yet more required. If the criterion Cbs is met {i.e. SOC$\geqq$Cbs (constant) or SOC $\epsilon$ admissible range of Cbs(parameter)}, the control flow gets out of the SOC complement cycle, and goes to an end to enter the normal run. Or else {i.e. SOC<Cbs (constant) or SOC $\notin$ admissible range of Cbs(parameter)}, the control flow enters the battery charge mode, where it goes to a subsequent step S6.

At the step S6, an estimation by calculation is made to determine a magnitude of chargeable power to a current state of battery 7 (hereafter called "possible charge") Cp depending on read data including an interfaced temperature Tb and SOC from battery detection signal SG3. This estimation provides a bar to an excessive power supply to the battery 7 that may lead to an excessive charge, as well as a bar to an excessive power generation at the stack 1 that may have an unchargeable amount of energy as a surplus to be wasted.

At a subsequent step S7, an estimation by calculation is made to determine a probable power consumption W1 at the first type of auxiliary equipment (i.e. IL except for compressor 15), depending on associated data among interfaced data from ES detection signal (SA, SV, ST, SG1 to SG3), and/or ES control command (CT1 to CT3). For example, power consumption of coolant recirculation pump 16 may be determined from associated data among stack peripheral control command CT1 including a coolant flow command.

At a subsequent step S8, an estimation by calculation is made to determine a probable power consumption W2 at the second type of auxiliary equipment (i.e. compressor 15), depending on associated data among interfaced data from ES detection signal (SA, SV, ST, SG1 to SG3), ES control command (CT1 to CT3), and/or estimation results (Gp, Dp, Cp, W1).

The air compressor 15 delivers compressed air to be supplied to the stack 1 at a controlled flow rate under a controlled pressure, as necessary for the stack 1 to generate required power. The compressed air pressure and flow rate are varied, as the required power generation varies.

For example, a sum (Cp+W1) of possible charge Cp (estimated at step S6) and power consumption W1 (estimated at step S7) is based to estimate required power generation at the stack 1, assuming a supply of compressed air under a corresponding condition (flow rate, pressure), which determines an operating condition (motor rpm, torque) of compressor 15, allowing the power consumption W2 to be estimated. The required power generation at the stack 1 is estimated within a range defined by an upper limit, to avoid exceeding the possible generation Gp (at step S1).

The power consumption W2 at compressor 15 may be otherwise estimated. For example, a history of successful startup of the system FS may be recorded, involving a power generation of stack 1 in SOC complement cycle, of which a fraction is charged to the battery 7, and the rest is consumed in the internal load IL (=auxiliary equipment as combination of the first type and the second type). The power consumption W2 at the second type of auxiliary-equipment (15) can thus be broken down, with an enhanced precision of power generation control.

It also is possible to use a stored value of power consumption W2 in a previous battery charge mode or SOC complement cycle, or to calculate or scan an actual value of power consumption W2 from interfaced data of detection signal SG1. It is noted that power consumption (W1+W2) in the whole auxiliary equipment may be estimated or read in a single step (S7+S8).

At a subsequent step S9, an estimation by calculation is made to determine a required power generation G at the stack 1, as a sum of possible charge Cp (at step S6), power consumption W1 (at step S7), and power consumption W2 (at step S8). Then, the stack 1 is controlled by peripheral control command CT1 to maintain the required power generation G (=Cp+W1+W2).

At a subsequent step S10, the energy pump EP (=distributor 4+battery 7) is controlled by EP control command (CT2+CT3), so that the battery 7 is charged with estimated power Cp (possible charge). It is noted that the energy supply ES (=stack 1+energy pump EP) may be controlled by ES control command (CT1+CT2+CT3) in a single step (S9+S10).

The SOC complement cycle (steps S5 to S10) is repeated until the criterion Cbs is met {i.e. SOC≧Cbs(constant) or SOC ∈ admissible range of Cbs(parameter)} at the step S5, when the control flow goes to the end to enter the normal run, as the SOC of battery 7 is now high enough to supply, in cooperation with stack 1, required power for the whole load set WL.

At the decision step S4 (FIG. 3A), if the SOC is high enough {i.e. SOC≧Cbs(constant) or SOC ∈ admissible range of Cbs(parameter)} or the battery temperature Tb is insufficiently high {i.e. Tb<Cbt(constant) or Tb ∉ admissible range of Cbt(parameter)}, the control flow enters the battery warm-up mode (steps S11 to S22), where it goes to the step 511, as described.

At this step S11, as the battery 7 needs to be warmed in either a discharge mode (steps S13 to S17) or a charge mode (steps S18 to S22), the controller 8 interrogates if the SOC is high or the temperature Tb is low. In the case of high SOC {i.e. SOC≧Cbs(constant) or SOC ∈ admissible range of Cbs (parameter)}, the controller 8 sets a flag 'NO' for a selection of the charge mode. In the case of low temperature Tb {i.e. Tb<Cbt (constant) or Tb ∉ admissible range of Cbt(parameter)}, the controller 8 sets a 'YES' flag for the charge mode selection, which may be a mere inverse of the 'NO' flag.

It is noted that for the above-noted selection of 'YES' or 'NO' flag in a subsequent full warm-up cycle (S1 to S22) after the current cycle, the controller 8 may simply check, at the step S11, for a mode change flag to be set after a minor decision as to whether a mode change is necessary or desirable between the discharge mode and the charge mode. For this decision, a repeated number of times or durations of discharge or charge may be counted or integrated, and compared with a threshold; or interfaced data from battery detection signal SG3 may be collated to a stored table or compared with a threshold, for such a conclusion that with an elapse of time the battery 7 is disabled to again discharge required power or again accumulate distributed power, or is enabled to accumulate distributed power or to discharge required power.

Then, the control flow goes to a decision step S12, where the mode selection flag ('NO' or 'YES') is read. If the flag is 'NO', the control flow enters the discharge mode. Or else ('YES' flag), the control flow enters the charge mode.

In the discharge mode (S13 to S17), the control flow sequentially goes to a step S13 for an estimation by calculation to determine a possible discharge Dp from battery 7 (like step S2), a step S14 for an estimation by calculation to determine power consumption W1 at the first type of auxiliary equipment (like step S7), and a step S15 for an estimation by calculation to determine power consumption W2 at the second type of auxiliary equipment (like step S8). It is noted that power consumption (W1+W2) in the whole auxiliary equipment may be estimated or read in a single step (S14+S15).

At a subsequent step S16, an estimation by calculation is made to determine a required power generation G at the stack 1, with a priority to warming battery 7 by its own heat dissipation, than warming stack 1. The energy pump EP is thus assumed to be controlled for pumping accumulated energy in battery 7, with a priority over generated power at stack 1, to deliver power for consumption at the compressor 15. That is, of the power to be consumed at the compressor 15, such a fraction that a current battery condition can cover is to be discharged from battery 7. As the rest is supplied from stack 1, its power generation G has to cover power consumption W2 (at compressor 15) minus possible discharge Dp (from battery 7), so that G>W2−Dp.

The required power generation G at the stack 1 is estimated as a sum of the above-noted rest (W2−Dp), power consumption W1 at the first type of auxiliary equipment, and (if necessary) read data of power consumption by external load EL. When the possible discharge Dp is greater than the power consumption W2, the difference (Dp−W2) may constitute a subtractor in the estimation of required power G. The stack 1 may have a lower limit preset for its power generation. In this case, the required power generation G should be estimated within a range defined by the lower limit.

In estimation of the required power generation G for a discharge mode (S13 to S17) in a subsequent full warm-up cycle (S1 to S22) after the current cycle, temperature data (Tb, Ts) among interfaced data from battery detection signal (SG3) and stack detection signal (SA, SV, ST) may be used to calculate a battery temperature (Ts) rising speed and a stack temperature (Ts) rising speed, and the results (Tb-rise, Ts-rise) may be compared therebetween.

Upon a decision for the former (Tb-rise) to be higher than the latter (Ts-rise), the possible discharge Dp from battery 7 may be lowered by a decrement, and the required power generation G at stack 1 may be augmented by a commensurate increment to the decrement, to thereby promote warming the stack 1. To the contrary, upon a decision for the former (Tb-rise) to be lower than the latter (Ts-rise), the possible discharge Dp from battery 7 may be augmented by an increment, and the required power generation G at stack 1 may be lowered by a commensurate decrement to the increment, to thereby promote warming the battery 7.

Then, the stack 1 is controlled by peripheral control command CT1 to maintain the required power generation G (=W1+W2−Dp+necessary power for EL).

At a subsequent step S17, the energy pump EP (=distributor 4+battery 7) is controlled by EP control command (CT2+CT3), so that the battery 7 discharges estimated power Dp (possible discharge), with the priority assumed at step S16. It is noted that the energy supply ES (=stack 1+energy pump EP) may be controlled by ES control command (CT1+CT2+CT3) in a single step (S16+S17).

Then, the control flow goes again to the step S1, to repeat the full warm-up cycle (S1 to S22), as necessary.

In the charge mode (S18 to S22), the control flow sequentially goes to a step S18 for an estimation by calculation to determine a possible charge Cp to battery 7 (like step S6), a step S19 for an estimation by calculation to determine power consumption W1 at the first type of auxiliary equipment (like step S7), and a step S20 for an estimation by calculation to determine power consumption W2 at the second type of auxiliary equipment (like step S8).

At a subsequent step S21, an estimation by calculation is made to determine a required power generation G at the stack 1, as a sum of possible charge Cp (at step S18), power consumption W1 (at step S19), power consumption W2 (at step S20), and (if necessary) read data of power consumption by external load EL. The required power generation G at the stack 1 is estimated within a range defined by an upper limit, to avoid exceeding the possible generation Gp (at step S1). Then, the stack 1 is controlled by peripheral control command CT1 to maintain the required power generation G (=Cp+W1+W2+necessary power for EL).

At a subsequent step S22, the energy pump EP (=distributor 4+battery 7) is controlled by EP control command (CT2+CT3), so that the battery 7 is charged with estimated power Cp (possible charge). A small fraction of accumulated energy in battery 7 dissipates as heat, promoting warm-up of battery 7. It is noted that the energy supply ES (=stack 1+energy pump EP) may be controlled by ES control command (CT1+CT2+CT3) in a single step (S21+S22).

Then, the control flow goes again to the step S1, to repeat the full warm-up cycle (S1 to S22), as necessary.

The battery warm-up mode (S11 to S22) is repeated until the pair of criteria Cbs and Cbt are both met {i.e. SOC<Cbs (constant) or SOC $\notin$ admissible range of Cbs(parameter), and Tb$\geqq$Cbt(constant) or Tb $\in$ admissible range of Cbt(parameter)} at the step S4 to enter the SOC complement cycle (S5 to S10). This warm-up mode (S11 to S22) appears as charge mode (S18 to S22) or discharge mode (S13 to S17), whichever is selective at step S11 in accordance with the battery condition (SOC, Tb), more specifically, substantially depending on the SOC, as the battery temperature Tb is gradually raised. The SOC at step S11 increases along repetition of charge mode, and decreases along repletion of discharge mode. Therefore, during the low-temperature startup, a sequence of charge modes and a sequence of discharge modes are alternately selected, so that the generation G of stack 1 is varied in a pulsating manner, like the second warm-up control illustrated in FIGS. 5A to 5C.

In the battery warm-up mode (S11 to S22), the energy pump EP may deliver electric power to the heater 6 for efficient warm-up of stack 1 and/or battery 7.

The full warm-up cycle (S1 to S22) is repeated until the criterion Cfc is met {i.e. constant Gp+constant Dp$\geqq$Cfc(constant), or Gp(parameter)+Dp(parameter) $\in$ admissible range of function Cfc(parameter), within time interval tf} at the step S3 to enter the normal run.

(Effects by First Warm-Up Control)

Repetition of an energy accumulating charge mode (S6 to S10, or S18 to S22) and/or an energy releasing discharge mode (S13 to S17) of energy supply ES promotes warm-up by own heat dissipation of stack 1 and battery 7, allowing for an efficient and short warm-up in a startup of fuel cell system FS, before entering a normal run to supply the load 5 with sufficient power.

Along with warm-up of stack 1 and battery 7, discharged power from the battery 1 can be supplied to the heater 6, allowing for a faster and shorter warm-up.

In the charge mode, power generation G to be estimated is kept within a range under possible generation Gp, below a sum of possible charge Cp and estimated power consumption (W1+W2) at auxiliary equipment, allowing the prevention of overcharge with a maintained power balance.

In the discharge mode, when a stack temperature Ts rises faster than a battery temperature Tb, possible discharge Dp to be estimated is decreased and power generation G to be estimated is commensurately increased, and when the battery temperature Tb rises faster than the stack temperature Ts, the possible discharge Dp is increased and the power generation G is commensurately decreased, allowing for a short startup with a maintained balance in temperature rise.

(Second Warm-Up Control)

Description is now made of the second warm-up control of fuel cell system FS, with reference to FIGS. 4A and 4B, FIGS. 5A to 5C, FIGS. 6A and 6B, and FIGS. 7 to 11. The second warm-up control is programmed as a pulsating warm-up cycle (steps S40 et seq.) including a parameter setting process (step 530).

Figure 4A:
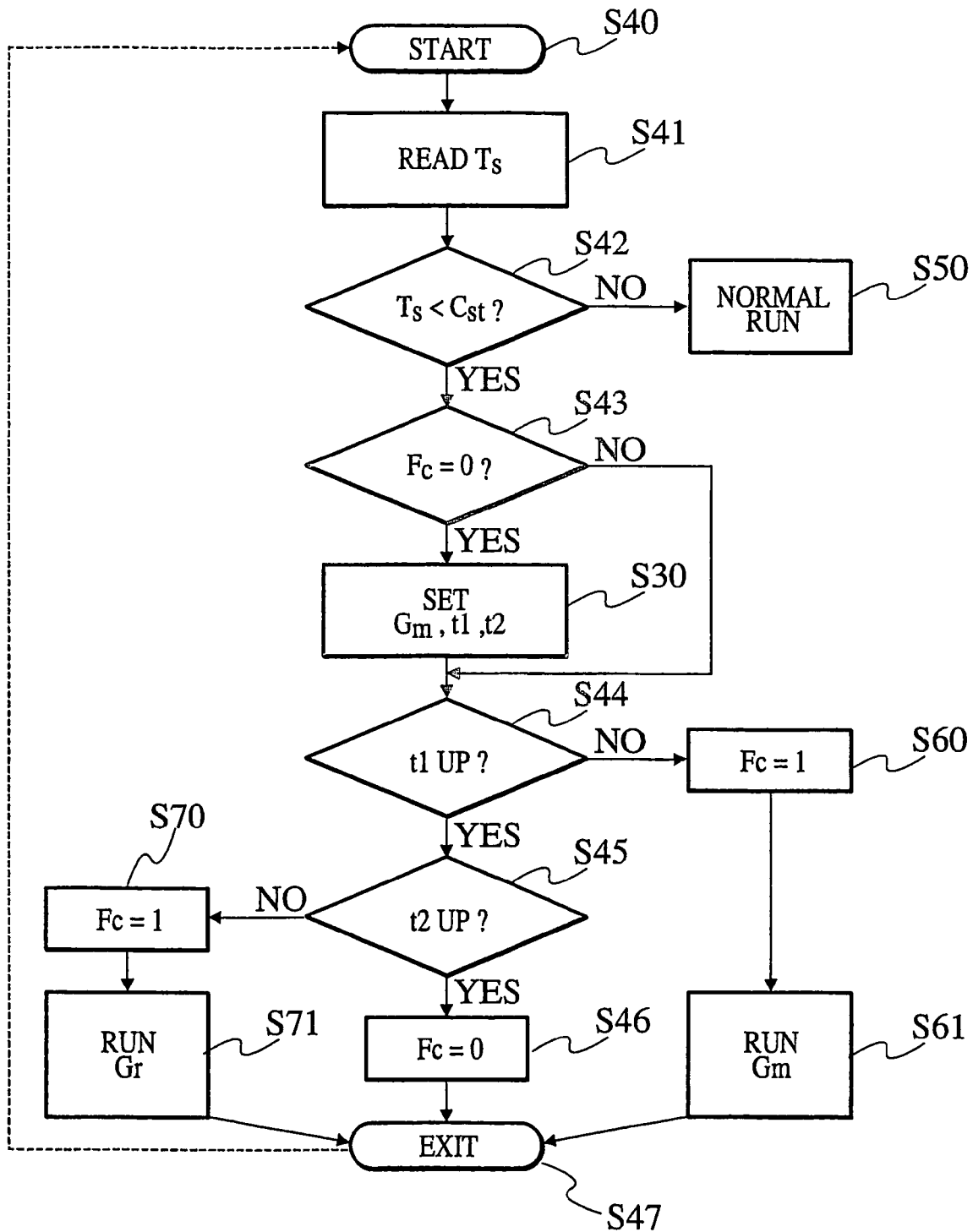
FIG. 4A is a flowchart of a pulsating warm-up cycle in a second warm-up control of the fuel cell system of FIG. 1.
Figure 4B:
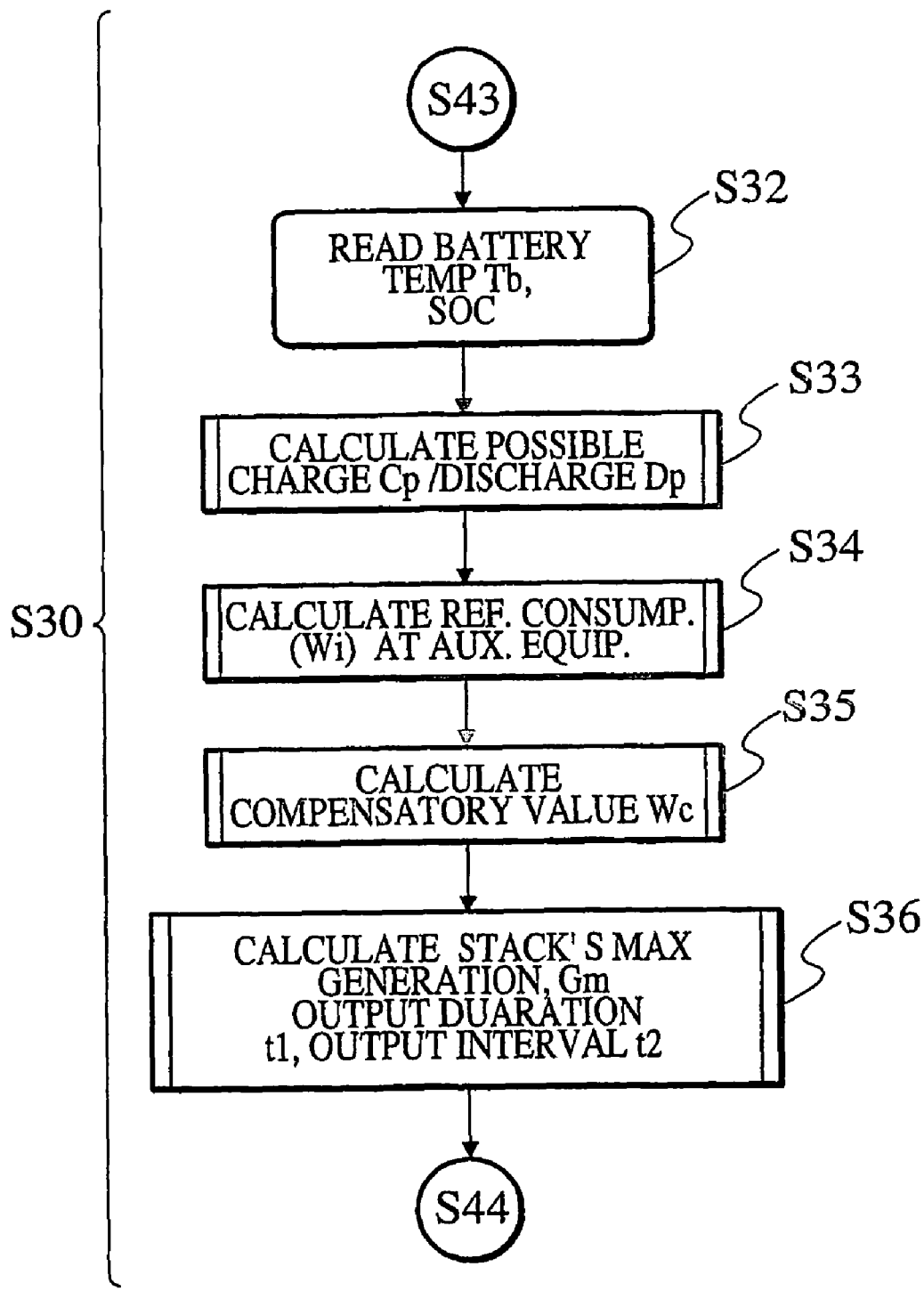
FIG. 4B is a flowchart of a parameter setting process in the pulsating warm-up cycle.
Figure 5A:
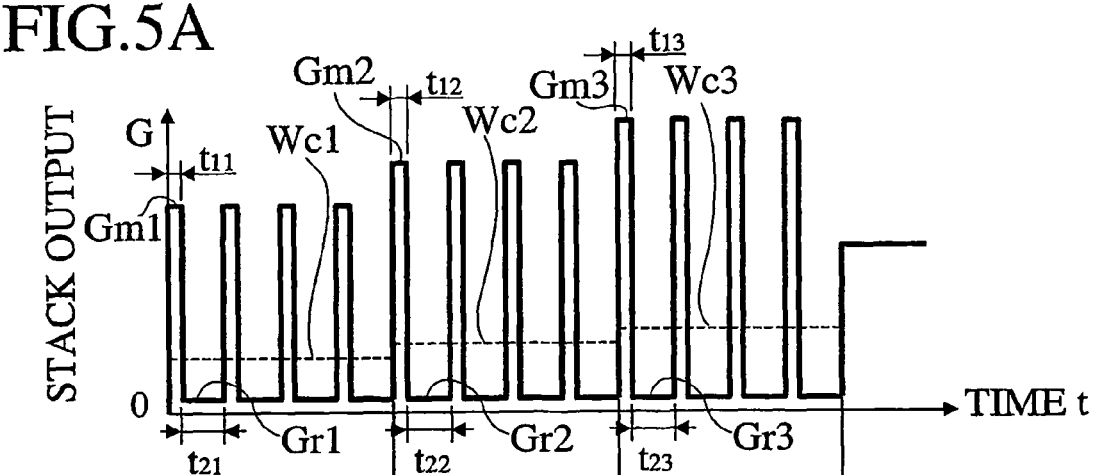
Figure 5B:
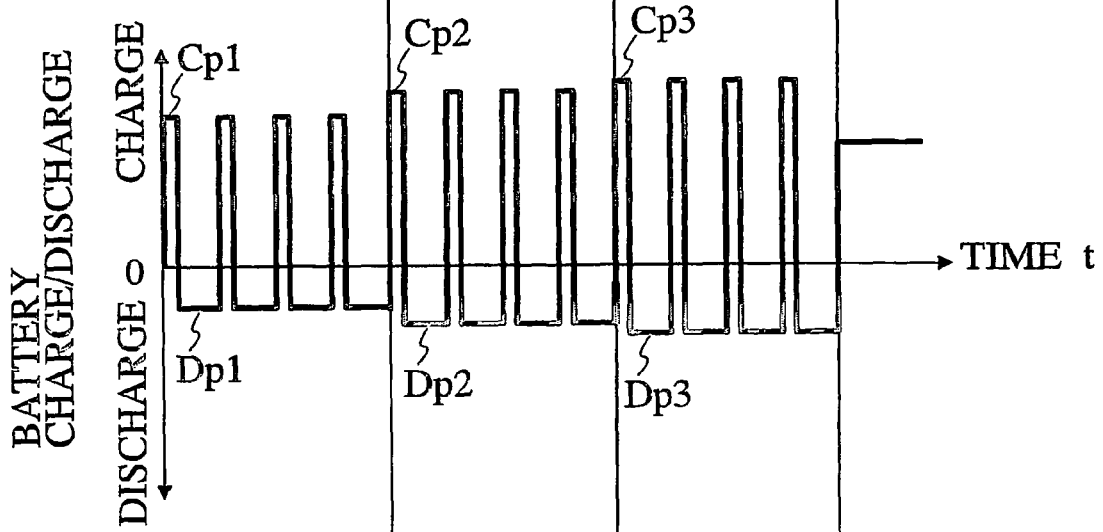
Figure 5C:
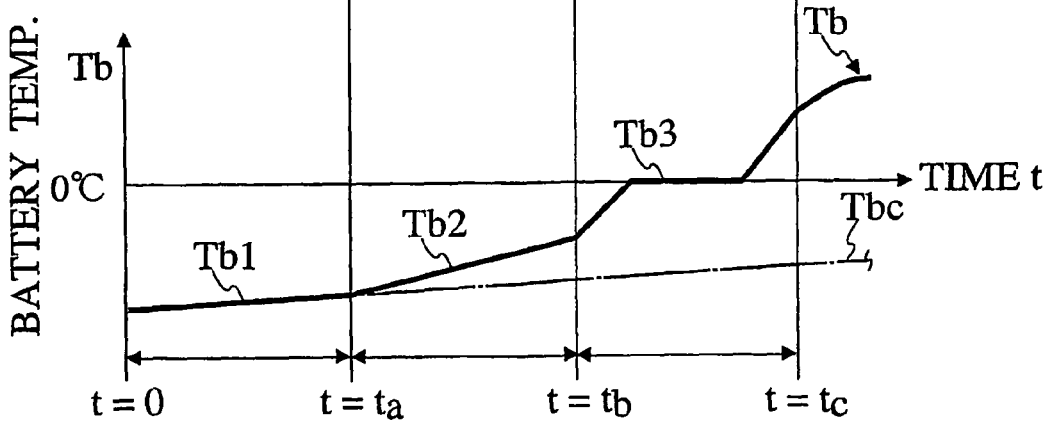
Figure 6A:
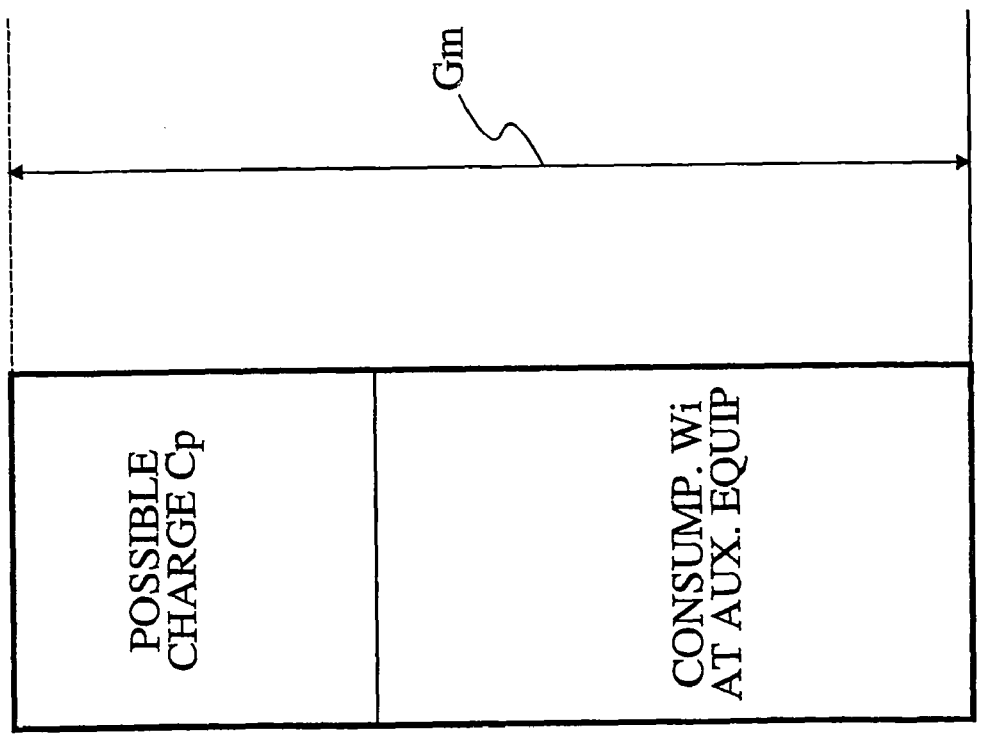
Figure 6B:
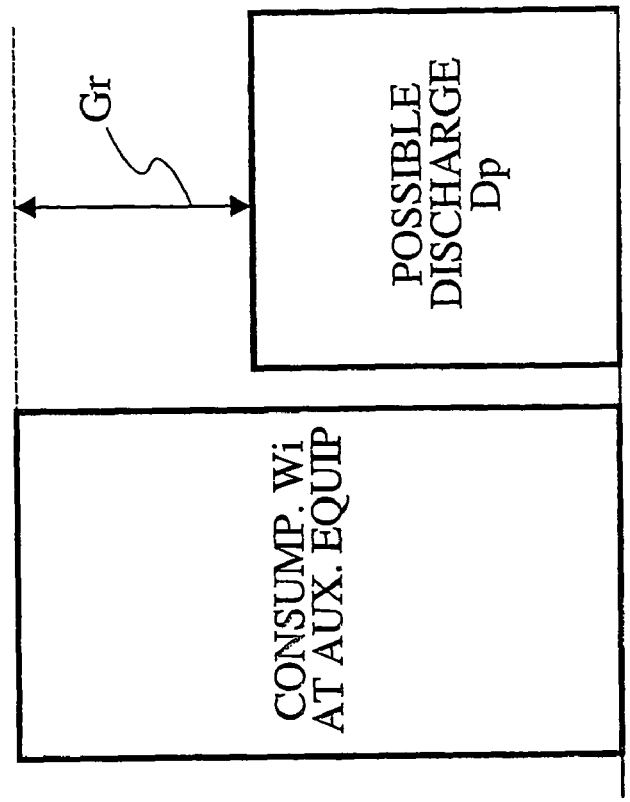
Figure 8:
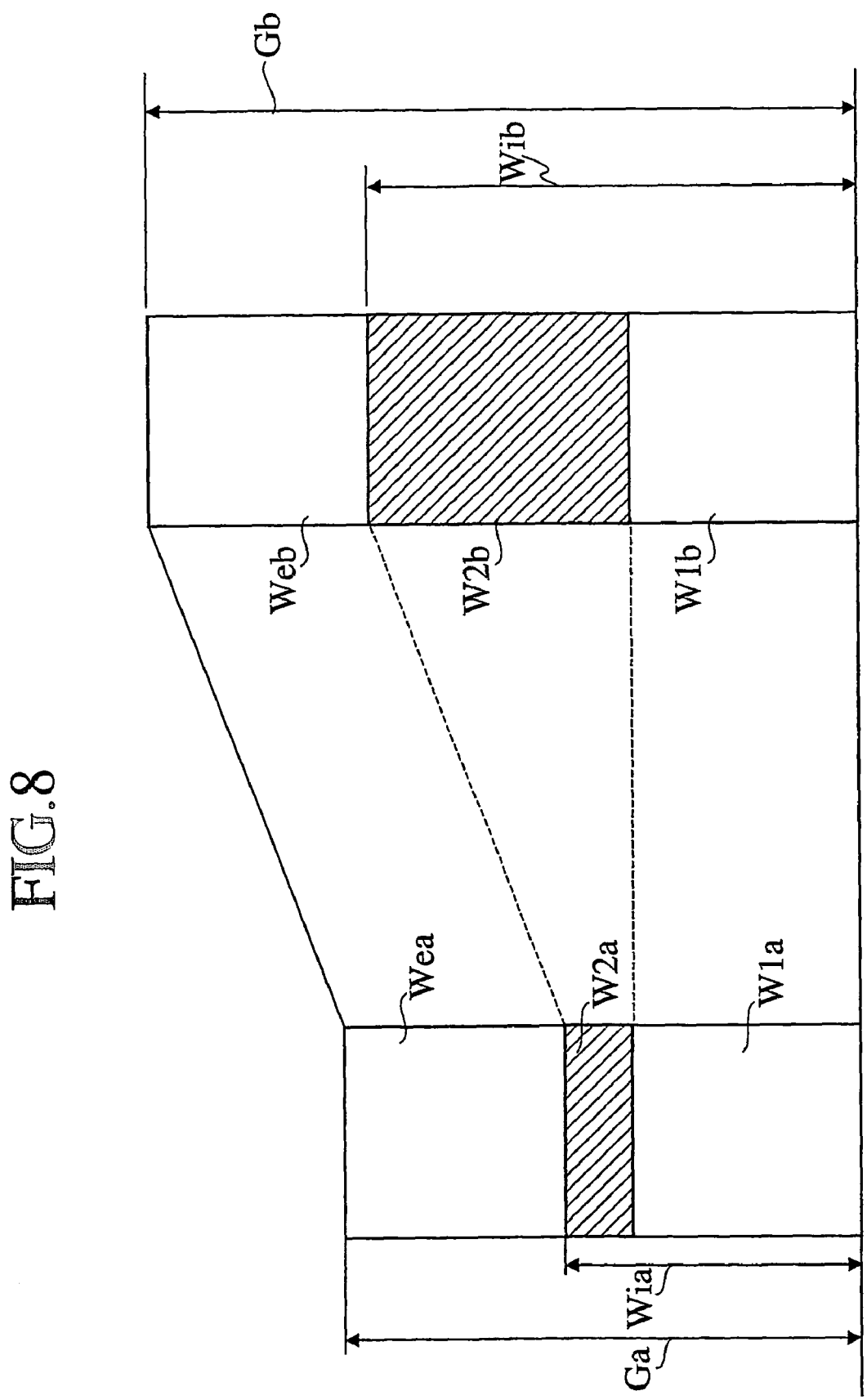
Figure 9:
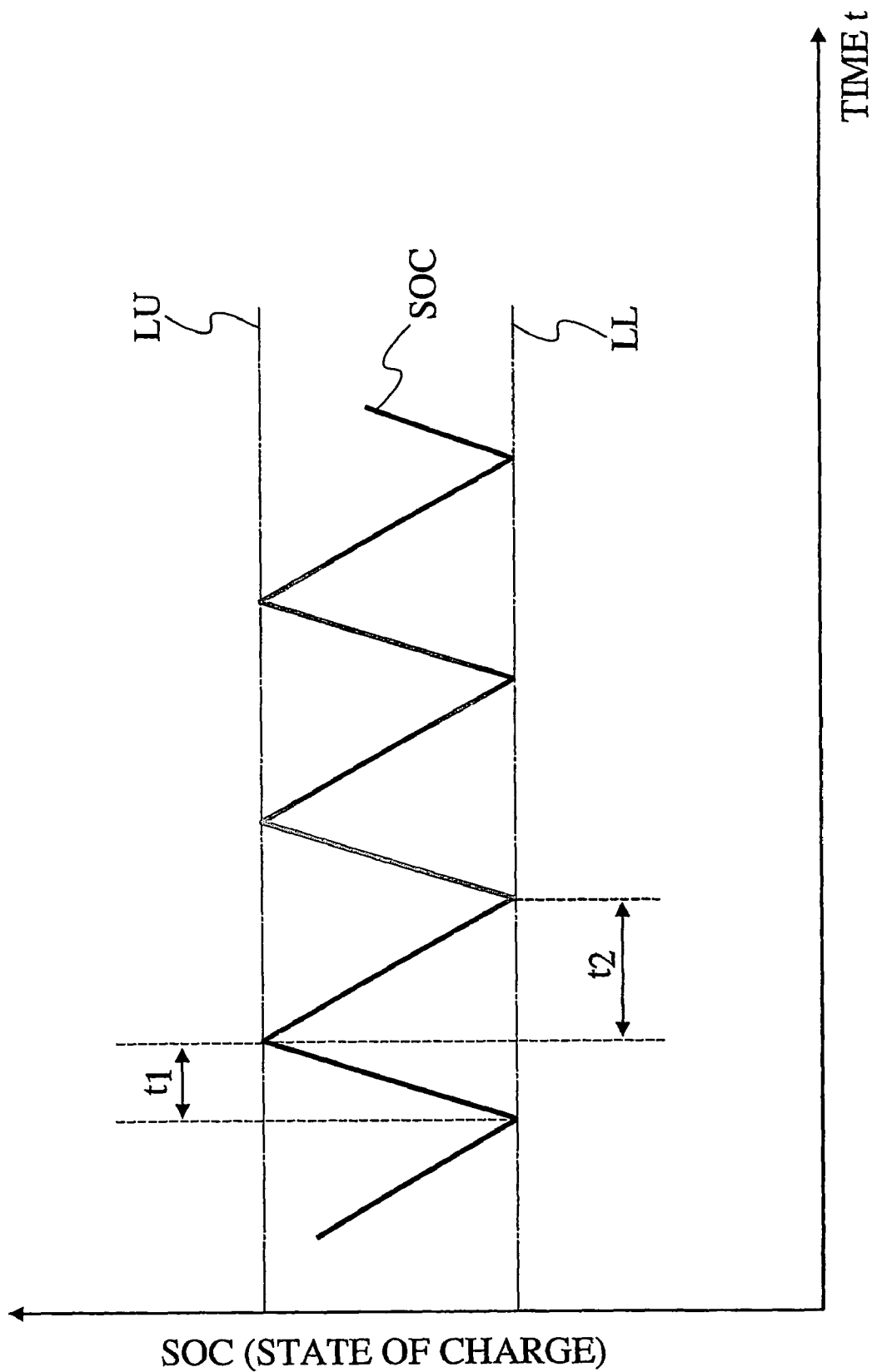
Figure 10:
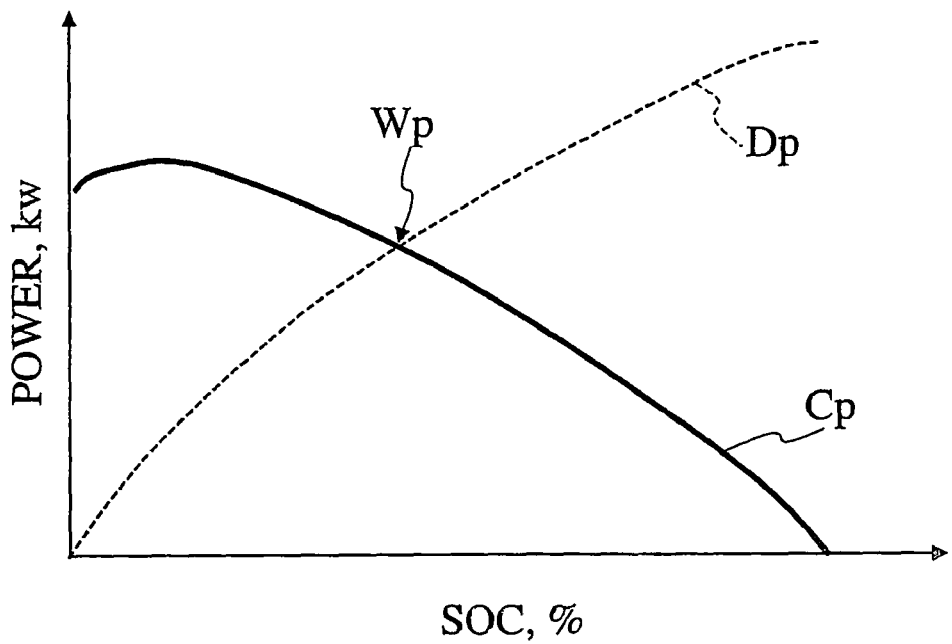
Figure 11:
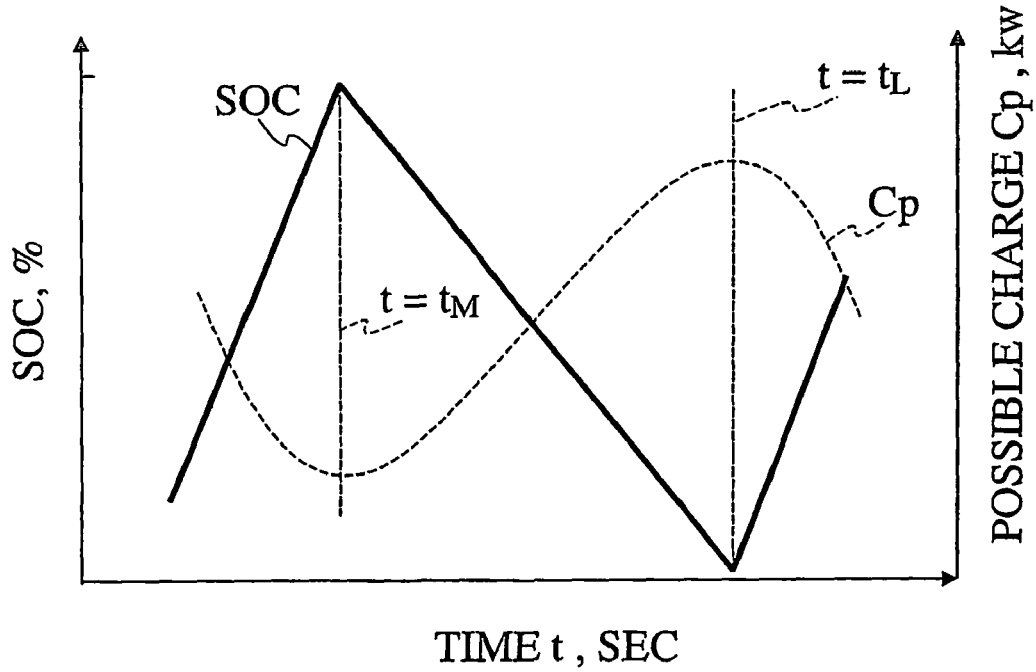

FIG. 4A shows an entirety of the pulsating warm-up cycle, and FIG. 4B, the parameter setting process. FIGS. 5A to 5C show working conditions (generation G at stack 1, charge/discharge at battery 7, temperature Tb of battery 7) of the energy supply ES in the pulsating warm-up cycle. FIGS. 6A and 6B illustrate relationships (Gm=Wi+Cp, Gr=Wi−Dp) among maximum or reduced generation (Gm, Gr), possible charge (Cp) or discharge (Dp), and power consumption (Wi) by auxiliary equipment (IL). FIGS. 7 to 11 describe load and battery characteristics of the energy supply ES and associated terms, in which described at FIG. 7 is a sequence of power charge/discharge events, FIG. 8 is an augmentation of total power consumption {to be G as combination of consumption Wi (=W1+W2) by IL and consumption We by EL, each respectively suffixed with a or b representing one of a normal run (a) and an embodiment of the invention (b) }, FIG. 9 is a sequence of SOC variations confined between upper limit UL and lower limit LL, FIG. 10 is a working point Wp of battery 7 as an intersect between Cp and Dp, and FIG. 11 is a relationship of Cp to SOC in interrupt duration (t2) defined between t=$t_M$ and t=$t_L$. Note that FIG. 7 is a detailed chart of FIG. 5B, and FIG. 11 is a detailed chart of FIG. 9.

As shown in FIG. 4A, the pulsating warm-up cycle (control flow of solid lines) is adapted to interrupt a greater control cycle (control flow of broken lines), such as an FS (fuel cell system) operation control cycle, under control by the system controller 8, so that the control flow of this cycle (broken line) enters that cycle (solid line) at a step S40, and exits therefrom at a step S47.

In the warm-up cycle, the control flow first goes to a step S41, where an interfaced data (Ts) from the stack temperature detection signal ST is read as a stack temperature Ts.

Then, at a decision step S42, the stack temperature Ts is compared with a pulsating warm-up cycle criterion Cst (as a threshold within time interval tf shown in FIG. 3A), for a decision as to whether a pulsating warm-up mode (S43 et seq.) is yet required. It is noted that, for this decision (S42), initially (time t<ta in FIG. 5C) the stack temperature Ts can represent a battery temperature (Tb). This stack temperature (Ts before time ta) may thus be represented by an ambient or outdoor air temperature detected by a sensor therefor.

If the criterion Cst is met (Ts$\geqq$Cst), the control flow gets out of the warm-up cycle, as neither stack 1 nor battery 7 needs extended warm-up, and goes to a step S50, entering a normal run to supply required power for the whole load set WL. Or else (i.e. Ts<Cst), the control flow goes to a subsequent decision step S43, entering the pulsating warm-up mode (S43 et seq.), where stack 1 and battery 7 are concurrently warmed up (like Tb1, Tb2, and Tb3 in FIG. 5C) in a pulsating manner (like G in FIG. 5A and Cp/Dp in FIG. 5B) so that (with elapse of time t passing ta, tb, and tc in FIG. 5C) the criterion Cst be met (at time tc) along an enhanced temperature-rise curve Tb in FIG. 5C, i.e. well earlier than along straight temperature-rise curve Tbc representing a normal run.

At the step S43, a later-described-duration (t1, t2) count flag Fc is checked if Fc=0 (false). If it is so (i.e. Fc=0), the control flow enters the parameter (Gm, tr1, tr2) setting process S30. Or else, i.e. if the flag Fc is 1 (truth), the control flow goes to another decision step S44.

In the parameter setting process S30, as shown in FIG. 4B, the control flow goes to a step S32, where interfaced data (Tb, SOC) from battery detection signal SG3 are read as a combination of battery temperature Tb and SOC representing a current condition of the battery 7 (at time t=0, ta, tb, or tc in FIG. 5C).

Then, at a step S33, based on the read temperature Tb and SOC of battery 7, an estimation by calculation is made to determine a possible charge Cp to battery 7 (assuming relationships in FIGS. 6A, 7, and 10-11) or possible discharge Dp from battery 7 (assuming relationships in FIGS. 6B, 7 and 10).

At a subsequent step S34, an estimation by calculation is made to determine a power consumption (Wi) at auxiliary equipment for startup, in terms of a reference value for the stack 1 to generate required power to simply effect the charge Cp to battery 7 as estimated at step S33, with a normal or factory-settable margin left to a potential performance under current condition of warm-up in low-temperature startup of energy supply ES. Such a reference value (Wi) may be read from a stored data map between the possible charge Cp and a commensurate reference power consumption at auxiliary equipment.

At a subsequent step S35, additional calculations are made to provide an incremental compensatory value Wc for the reference power consumption (Wi), and to estimate a power consumption Wi at auxiliary equipment for startup, in terms of a value (Wi) compensated by the compensatory value Wc (assuming relationships in FIGS. 6A, 6B, and 8).

This compensation is allowed at the cost of, and after critical estimation of, a possible curtailment of the above-mentioned margin to potential performance under current warm-up condition. The compensatory value Wc is thus commensurate to the curtailment of margin. It is noted that, if after establishment of normal run, such a curtailment of margin would have resulted in a mere loss of energy wasted by dissipation of heat In the low-temperature startup, however, resultant increase in heat dissipation at stack 1 as well as at battery 7 contributes to a progressive promotion of warm-up of energy supply ES, as illustrated by curve Tb in FIG. 5C.

At a subsequent step S36, an estimation by calculation is made to determine three parameters for pulsation (assuming relationships in FIGS. 9 to 11): a pulse level as a maximum power generation Gm (FIG. 6A) at stack 1, equivalent to a sum (Wi+Cp) of the compensated power consumption Wi at auxiliary equipment and the possible charge Cp to battery 7; a pulse duration as a possible output duration t1 of the maximum power generation Gm, that corresponds to a duration t1 of charge Cp Illustrated in FIG. 7; and a pulse interval as a necessary interrupt interval t2 of the possible output duration t1, that corresponds to a duration t2 of discharge Dp illustrated in FIG. 7. During the interrupt interval t2, the stack 1 is controlled to have a reduced generation Gr (FIG. 6B) equivalent to a difference (Wi−Dp) between the compensated power consumption Wi at auxiliary equipment and the possible discharge Dp from battery 7. Accordingly, as used herein, the pulse interrupt interval t2 is referred to as a duration t2 of reduced generation Gr.

Now, the control flow has come to the decision step S44.

At the step S44, as shown in FIG. 4A, after interrogation to a clock counter or timer in the controller 8, a decision is made as to whether the duration t1 of maximum generation Gm is timed up. If the duration t1 is timed up, the control flow goes to another decision step S45. Or else, i.e. unless t1 is timed up, the control flow goes to a subsequent step S60.

At the step S60, the duration count flag Fc is set so that Fc=1, which means a time count of the duration t1 of maximum generation Gm or the duration t2 of reduced generation Gr is continued with respect to a current pulse.

At a subsequent step S61, ES control command (CT1 to CT3) is output, so that the energy supply ES is controlled to run with stack 1 at maximum generation Gm, allowing continued charge Cp to battery 7. Then, the control flow exits a current pulsating mode (at S47).

At the decision step S45, after interrogation to a clock counter or timer in the controller 8, a decision is made as to whether the duration t2 of reduced generation Gr is timed up. If the duration t2 is timed up, the control flow goes to a subsequent step S46, where the duration count flag Fc is set down so that Fc=0. Or else, i.e. unless t2 is timed up, the control flow goes to another step S70.

At the step S70, the duration count flag Fc is set so that Fc=1.

At a subsequent step S71, ES control command (CT1 to CT3) is output, so that the energy supply ES is controlled to run with stack 1 at reduced generation Gr, allowing continued discharge Dp from battery 7. Then, the control flow exits the current pulsating mode (at S47).

(Working Conditions of Fuel Cell System in Second Warm-Up Control)

Description is now made of working conditions of fuel cell system FS in the second warm-up control, with reference to FIGS. 5A to 5C, FIGS. 6A and 6B, and FIGS. 7 to 11. It is noted that this description is applicable also to the first warm-up control.

As the second warm-up control is repeated (from t=0, where warm-up starts, to t=tc, where normal run starts), the power generation G at stack 1 is varied in a pulsating manner (as in FIG. 5A) between: periodical occurrences of maximum generation Gm (set to an initial value Gm1 at t=0, an increased value Gm2 at t=ta>0, and a yet increased value Gm3 at t=tb>ta) lasting a relatively short duration t1 (set to t11 at t=0, t12 at t=ta, and t13 at t=tb); and intervening occurrences of reduced generation Gr (set to an initial value Gr1 at t=0, an even value Gr2 at t=ta, and a still even value Gr3 at t=tb) lasting a relatively long duration t2 (set to t21 at t=0, t22 at t=ta, and t23 at t=tb).

In synchronism with pulsating power generation G, also the charge/discharge operation of battery 7 is controlled in a pulsating manner (as in FIG. 5B) between: periodical occurrences of charge Cp (set to an initial value Cp1 at t=0, an increased value Cp2 at t=ta, and a yet increased value Cp3 at t=tb); and intervening occurrences of discharge Dp (set to an initial value Dp1 at t=0, an increased value Dp2 at t=ta, and a yet increased value Dp3 at t=tb), whereby the battery's dissipation of own heat is progressively increased, likewise increasing the temperature Tb as illustrated in FIG. 5C.

The stepwise increase in value of maximum generation Gm in FIG. 5A is controlled by use of stepwise varied compensatory value Wc (increased from initial Wc1 to greater Wc2 at t=ta, and from Wc2 to yet greater Wc3 at t=tb) in consideration of progressive battery temperature-rise (along a first curve segment Tb1 with an initial gradient, a second curve segment Tb2 with an increased gradient, and a third curve segment Tb3 with a progressively increased gradient) in FIG. 5C.

The maximum generation Gm=Wi+Cp, as illustrated in FIG. 6A, and reduced generation Gr=Wi−Dp, as illustrated in FIG. 6B.

As detailed in FIG. 7, a charged amount of energy (hatched region with a height Cp) within each duration t1 corresponds to a discharged amount of energy (blank region with a depth Dp) within subsequent duration t2.

The reference power consumption (Wi) at auxiliary equipment IL may well be smaller than a sum (Dp+Gr) of the possible discharge Dp and the reduced generation Gr as a minimum generation at stack 1 to be determined in consideration of a thermal deterioration of electrolyte film 1c due to oxidation by oxidizer Og, as well as of constituent elements of hydrogen supply 2.

The compensated power consumption Wi is set greater than the reference power consumption (Wi), wherefor the air compressor 15 is controlled to an increased (i.e. greater than a normal run) air supply pressure to stack 1, with a resultant increase in power consumption W2 at compressor 15. In this connection, the normal run is assumed to be representative of a case in which the reference power consumption (Wi) is directly used as the power consumption Wi at auxiliary equipment for startup.

This relationship is illustrated in FIG. 8, where parameters G (power generation at stack), We (power consumption at external load EL), Wi (compensated power consumption at auxiliary equipment or internal load IL), W1 (power consumption at the first type auxiliary equipment), and W2 (power consumption at the second type of auxiliary equipment, i.e. compressor 15 in this case) associated with the second warm-up control (suffixed b) are compared with those (G, We, Wi, W1, W2) associated with the normal run (suffixed a) whose performance curve Thc is shown in FIG. 5C.

As shown in FIG. 8, Web=Wea, and W1b=W1a, but W2b>W2a. Accordingly, Wib>Wia, and Gb>Ga. In other words, for the warm-up in low-temperature startup, the power consumption W2 at the compressor 15 is increased relative to the normal run, whereby the compensated power consumption Wi is set greater (by commensurate Wc). The increase in power consumption at compressor 15 is determined in consideration of pressures of associated fluids to be balanced so that the working condition of compressor 15 is set to be little influential on dry-out of stack 1, as well as on a deterioration of electrolyte film 1c due to pressure difference between hydrogen electrode 1a and air electrode 1b.

It will be apparent that the second type of auxiliary equipment may involve cooling fan 19 of radiator 18 to be operated with three-way valve 17 controlled to bypass the radiator 18, in order for the power consumption W2 to be thereby increased.

The stack 1 has a preset operation voltage V for maximum power generation Gm, and the stack current is increased as the power consumption Wi at auxiliary equipment increases, whereby heat dissipation at stack 1 is progressively promoted.

As illustrated in FIG. 9, the duration t1 of maximum generation Gm at stack 1 corresponds to a required time interval for target SOC of battery 7 to ascend from a lower limit LL to an upper limit UL, and the duration t2 of reduced generation Gr at stack 1 corresponds to a required time interval for target SOC of battery 7 to descend from the upper limit UL to the lower limit LL, wherefor power charge Cp and discharge Dp at battery 7 are balanced (as in FIG. 7), and power generation G at stack 1 is controlled accordingly.

As illustrated in FIG. 10, battery 7 is configured to have an decreased possible charge Cp with an increased possible discharge Dp, as the SOC is increased. Accordingly, if the target SOC is set high between the upper and lower limits UL and LL, the possible charge Cp is decreased, as well as the maximum generation Gm at stack 1. To the contrary, if the target SOC is set low, the duration t2 of reduced generation Gr (i.e. required time for target SOC change from upper limit UL to lower limit LL) is extended, with a resultant elongation of warm-up time. In the embodiment, therefore, the target SOC is set vicinal to a working point Wp where both possible charge Cp and discharge Dp can be set high enough for generation G at stack 1 to be effectively increased and decreased.

The upper and lower limits UL and LL of target SOC are set with a non-excessive level difference, in order for durations t1 and t2 to be both short, thereby suppressing a reduction of generation G due to decreased charge Cp, and an elongation of warm-up time by extended duration t2 due to decreased discharge Dp.

For possible operation at a target SOC, durations t1 and t2 are adjusted to an SOC just after a start of the second warm-up control. If the target SOC is higher than the SOC just after the start, the duration t1 is extended to increase this SOC. If the target SOC is lower than the SOC just after the start, the duration t2 is extended to decrease this SOC.

Then, if the possible power discharge Dp is smaller than the compensated power consumption Wi, battery 7 is operated for the discharge Dp, and power generation G at stack 1 is controlled not to fall below the reduced generation Gr as a difference between power consumption W1 and discharge Dp. If the possible power discharge Dp is greater than the compensated power consumption Wi, power generation G at stack 1 is interrupted or limited to reduced generation Gr. Preferably, this generation Gr should be secured by limiting discharge from battery 7.

After the lapse of duration t2, stack 1 is controlled for maximum generation Gm. The power generation G at stack 1 is thus repeated in a pulsating manner, accompanying dissipation of own heat for promotion of warm-up of stack 1, while battery 7 repeats a combination of intermittent charge and intermittent discharge to thereby effect its own warm-up.

As the possible charge Cp to battery 7 increases with increased battery temperature Tb, the compensated power consumption Wi is increased as necessary for power generation G at stack 1 to fulfill the charge Cp. Resultant increase in power generation G additionally promotes heat dissipation at stack 1.

(Effects of Second Warm-Up Control)

According to the embodiment described, pulsating power generation G at stack 1 is suppressed by limitations to SOC of battery 7, so that the battery 7 is kept from excessive charge or discharge.

Upon discharge from battery 7, reduced generation Gr at stack 1 is kept greater than a difference (Wi−Dp) between power consumption Wi at auxiliary equipment for startup and possible discharge Dp. If the discharge Dp exceeds power consumption Wi, the generation Gr at stack 1 is interrupted. Therefore, even with pulsating power generation G, battery 7 is kept from excessive discharge by the limitation to reduced power generation Gr.

In the case of possible discharge Cp exceeding power consumption Wi, the discharge Dp is limited, thereby allowing for prevention of a thermal deterioration of electrolyte film 1c due to oxidation by oxidizer Og transmitted through stack 1 under no-load condition, or for power generation G at stack 1 to be kept over necessary generation Gr to meet requirements from the arrangement for hydrogen recirculation, with possible avoidance of interruption of stack operation, as well as possible swift transition to a high-current density power generation.

By provision of target SOC enabling charge Cp and discharge Dp at sufficient power, power generation G at stack 1 is allowed within an enlarged range of variation, with possible suppression to a reduction of maximum generation Gm at stack 1 due to reduced possible charge Cp, as well as to an extension of interval t2 of maximum generation Gm due to reduced possible discharge Dp, enabling the warm-up to be completed within a shorter time.

At an upper limit UL of target SOC, power generation G at stack 1 is reduced within a higher range than the difference (Wi–Dp) between power consumption Wi and possible discharge Dp. In the case of possible discharge Dp exceeding power consumption Wi, stack 1 is operated for reduced generation Gr, thereby allowing for prevention of excessive charge without interruption of stack operation.

At a lower limit LL of target SOC, power generation G at stack 1 is augmented within a lower range than the sum (Wi+Cp) of power consumption Wi and possible charge Cp, allowing for prevention of excessive discharge.

Charge and discharge at battery 7 are limited by upper and lower limits UL and LL of target SOC, allowing for promoted warm-up of battery 7 in a short while.

By use of power consumption Wi compensated to be higher than reference power consumption (Wi), maximum generation Gm at stack 1 is increased higher than a normal run mode, with a resultant increase in power generation G that increases heat dissipation at stack 1.

Power consumption W2 at air supply 2 is increased so as to increase supply pressure and flow of oxidizer Og to stack 1, with a resultant increase Wc in compensated power consumption Wi at auxiliary equipment for startup, that can serve as a margin for surplus power generation at stack 1, allowing for a shorter warm-up of stack 1, without needing an extra component therefore, such as a resistor.

Power consumption at radiator cooling fan 19 can also be increased, with a resultant increase Wc in compensated power consumption Wi.

Power consumption (Wi) at auxiliary equipment for startup is increased by compensation within a range under the sum (Gr+Dp) of possible discharge Dp and associated power generation Gr at stack 1, allowing for prevention of excessive discharge at battery 7, without apprehension of a short of power due to increased power consumption Wi.

While embodiment of the present invention has been described using specific terms, such description is for illustrative purposes, and it is to be understood that changes and variations may be made without departing from the scope of the following claims.

INDUSTRIAL APPLICABILITY

The present invention allows an efficient and short warm-up of a fuel cell system under low temperature condition.

The invention claimed is:

1. A fuel cell system comprising:
   an energy supply comprising a fuel cell, a power distributor connected to the fuel cell, and a secondary cell connected to the fuel cell via the power distributor;
   a load set connected to the fuel cell and the secondary cell via the power distributor, the load set comprising auxiliary equipment for power generation of the fuel cell; and
   a controller configured to start a temperature rise promoting operation, when the fuel cell system is started up and if a warm-up mode is required,
   wherein the controller is configured to perform the temperature rise promoting operation by alternately repeatedly switching between a first power distribution unit and a second power distribution unit regardless of power consumption of the load set, for promoting concurrent temperature rise of both of the fuel cell and the secondary cell,
   wherein the first power distribution unit has a first power generated at the fuel cell and distributed to the secondary cell and the load set, and
   wherein the second power distribution unit has a combination of a second power generated at the fuel cell and a third power discharged from the secondary cell, distributed to the load set.

2. A fuel cell system according to claim 1, wherein the controller is configured to control the first power smaller than:
   a possible maximum generation of the fuel cell; and
   a sum of a power consumption at the auxiliary equipment and a possible maximum power charge to the secondary cell.

3. A fuel cell system according to claim 1, further comprising a detection system configured to detect a first temperature of the fuel cell and a second temperature of the secondary cell, wherein the controller is configured to have:
   the first power increase, as the first temperature is lower in rising speed than the second temperature; and
   the second power decrease and the third power increase, as the first temperature is higher in rising speed than the second temperature.

4. A fuel cell system according to claim 1, wherein the controller is configured to control the first power within a limited range depending on an SOC of the secondary cell.

5. A fuel cell system according to claim 1, wherein the controller is configured to:
   have the second power limited within a range higher than a difference between the third power and a fourth power to be consumed at the auxiliary equipment; and
   control the power distributor to interrupt power supply from the fuel cell, as the third power is higher than the fourth power.

6. A fuel cell system according to claim 5, wherein the controller is configured to limit the third power, as the third power is higher than the fourth power.

7. A fuel cell system according to claim 1, wherein the controller is configured to set a target SOC of the secondary cell such that power generation at the fuel cell is allowed to be greater in variation.

8. A fuel cell system according to claim 7, wherein the controller is configured:
   to be responsible for an upper limit of the target SOC to decrease the second power within a range higher than a difference between the third power and a fourth power to be consumed at the auxiliary equipment; and
   to have the second power minimized, as the third power is higher than the fourth power.

9. A fuel cell system according to claim 7, wherein the controller is configured to be responsible for a lower limit of the target SOC to increase the first power within a range lower than a sum of a fourth power to be consumed at the auxiliary equipment and a possible charge to the secondary cell.

10. A fuel cell system according to claim 1, wherein the controller is configured to have a fourth power to be consumed at the auxiliary equipment, set higher than a reference consumption required for power generation of the fuel cell.

11. A fuel cell system according to claim 10, wherein the auxiliary equipment comprises an oxidizer supply configured to supply an oxidizer to the fuel cell, and wherein the controller is configured to increase power consumption at the oxidizer supply for the oxidizer to be supplied by an increased flow rate at an increased pressure, to increase the fourth power.

12. A fuel cell system according to claim 10, wherein the auxiliary equipment further comprises a cooling system configured for a water cooling of the fuel cell, with a cooling water line having a radiator provided with a cooling fan, and a bypass member to bypass the radiator, and wherein the controller is configured for operation of the bypass member to increase power consumption at the cooling fan, to increase the fourth power.

13. A fuel cell system according to claim 10, wherein the controller is configured to control the fourth power within a range lower than a sum of the second power and the third power.

14. A control method of a fuel cell system comprising an energy supply comprising a fuel cell, a power distributor connected to the fuel cell, and a secondary cell connected to the fuel cell via the power distributor, and a load set connected to the fuel cell and the secondary cell via the power distributor, the load set comprising auxiliary equipment for power generation of the fuel cell, the control method comprising:

promoting concurrent temperature rise of both of the fuel cell and the secondary cell by alternately repeatedly switching between a first distribution unit and a second power distribution unit regardless of power consumption of the load set, wherein the first power distribution unit has a first power generated at the fuel cell and distributed to the secondary cell and the load set, and wherein the second power distribution unit has a combination of a second power generated at the fuel cell and a third power discharged from the secondary cell, distributed to the load set; and starting the promoting concurrent temperature rise when the fuel cell system is started up and if a warm-up mode is required.

15. A fuel cell system comprising:

an energy supply comprising a fuel cell, a power distributor connected to the fuel cell, and a secondary cell connected to the fuel cell via the power distributor;

a load set connected to the fuel cell and the secondary cell via the power distributor; and a controller configured to start a temperature rise promoting operation to perform a warm-up control, when the fuel cell system is started up and if a warm-up mode is required, wherein the controller is configured to perform the temperature rise promoting operation by alternately repeatedly switching between a first power distribution unit and a second power distribution unit regardless of power consumption of the load set, for promoting temperature rise of the energy supply, wherein the first power distribution unit has a first power generated at the fuel cell and distributed to the secondary cell and the load set, and wherein the second power distribution unit has a combination of a second power generated at the fuel cell and a third power discharged from the secondary cell, distributed to the load set.

* * * * *